US010861255B1

(12) United States Patent
Karp et al.

(10) Patent No.: US 10,861,255 B1
(45) Date of Patent: Dec. 8, 2020

(54) SYSTEM AND METHOD FOR ANALYZING AND PRESENTING LOCATION AND LOCATION-RELATED DATA

(75) Inventors: Bryan Karp, Cedar Park, TX (US);
Bjorn Aannestad, Austin, TX (US);
Stephen Tenzer, Prior Lake, MN (US)

(73) Assignee: GEOTAB INC.

(*) Notice: Subject to any disclaimer, the term of this patent is extended or adjusted under 35 U.S.C. 154(b) by 84 days.

(21) Appl. No.: 13/409,911

(22) Filed: Mar. 1, 2012

Related U.S. Application Data

(60) Provisional application No. 61/448,078, filed on Mar. 1, 2011.

(51) Int. Cl.
| | |
|---|---|
| *G07C 5/02* | (2006.01) |
| *G07C 5/06* | (2006.01) |
| *G07C 5/08* | (2006.01) |
| *G08G 1/123* | (2006.01) |
| *G01C 21/00* | (2006.01) |
| *G01C 21/34* | (2006.01) |
| *G07C 5/00* | (2006.01) |
| *G01C 21/36* | (2006.01) |
| *G08G 1/00* | (2006.01) |

(52) U.S. Cl.
CPC .............. *G07C 5/02* (2013.01); *G01C 21/00* (2013.01); *G01C 21/3476* (2013.01); *G07C 5/008* (2013.01); *G07C 5/06* (2013.01); *G07C 5/08* (2013.01); *G08G 1/123* (2013.01); *G01C 21/343* (2013.01); *G01C 21/3469* (2013.01); *G01C 21/3484* (2013.01); *G01C 21/36* (2013.01); *G08G 1/20* (2013.01)

(58) Field of Classification Search
CPC .......... G07C 5/08; G07C 5/008; G01C 21/00; G01C 21/36; G01C 21/343; G01C 21/3484
See application file for complete search history.

(56) References Cited

U.S. PATENT DOCUMENTS 5,923,286 A * 7/1999 Divakaruni .............. 342/357.44
6,895,240 B2 * 5/2005 Laursen et al. ............. 455/420
(Continued)

OTHER PUBLICATIONS

GPS Fleet Solutions. http://web.archive.org/web/20060111043147/http://www.passivegps.com/pdf/CHECKmate%20Presentation-2.pdf. Archived Jan. 11, 2006.*

*Primary Examiner* — Robert T Nguyen
(74) *Attorney, Agent, or Firm* — Katten Muchin Rosenman LLP

(57) ABSTRACT

A system and method are disclosed for analyzing location-related data and presenting location-related data and analytics. Embodiments receive raw location data of a subject being tracked, identify stops of the subject being tracked based on the raw location data, correlate the identified stops with know points of interests (POIs), and create a trips file using the raw location data, the identified stops, and the correlated information. Embodiments further extracts and processes data in the trips file, generating processed location-related data and other data, determine an analysis to perform based on the trips file, perform the determined analysis on the processed location-related data and other data to generate one or more results, and forward the results of the analysis to a client to generate a dashboard or other display to be displayed.

30 Claims, 23 Drawing Sheets

(56) References Cited

U.S. PATENT DOCUMENTS

| | | | |
|---|---|---|---|
| 9,978,186 B2* | 5/2018 | LaFergola | G07C 5/08 |
| 2003/0182052 A1* | 9/2003 | DeLorme | G01C 21/3679 |
| | | | 701/533 |
| 2005/0171835 A1* | 8/2005 | Mook | G08G 1/20 |
| | | | 705/333 |
| 2005/0288948 A1* | 12/2005 | Devulapalli | G06Q 10/0639 |
| | | | 705/7.38 |
| 2006/0053075 A1* | 3/2006 | Roth | G06Q 10/06 |
| | | | 705/50 |
| 2007/0173993 A1* | 7/2007 | Nielsen | G07C 5/085 |
| | | | 701/33.4 |
| 2009/0005987 A1* | 1/2009 | Vengroff et al. | 701/300 |
| 2010/0088163 A1* | 4/2010 | Davidson | G07C 5/02 |
| | | | 340/425.5 |
| 2010/0131316 A1* | 5/2010 | Ben-Hamida | G06Q 10/08 |
| | | | 705/400 |
| 2010/0205022 A1* | 8/2010 | Brown | G06Q 10/063 |
| | | | 705/7.11 |
| 2011/0029233 A1* | 2/2011 | Carpenter | G08G 1/096822 |
| | | | 701/533 |
| 2011/0040440 A1* | 2/2011 | de Oliveira | G06Q 10/0631 |
| | | | 701/29.5 |
| 2011/0090075 A1* | 4/2011 | Armitage | G09B 19/167 |
| | | | 340/439 |
| 2011/0092159 A1* | 4/2011 | Park et al. | 455/41.2 |
| 2011/0178945 A1* | 7/2011 | Hirai | G06Q 10/08355 |
| | | | 705/338 |
| 2012/0004824 A1* | 1/2012 | Milton | F02D 19/0647 |
| | | | 701/103 |
| 2012/0130636 A1* | 5/2012 | Westerlage | G08G 1/20 |
| | | | 701/517 |
| 2012/0253548 A1* | 10/2012 | Davidson | G06Q 10/06398 |
| | | | 701/1 |
| 2012/0256770 A1* | 10/2012 | Mitchell | G08G 1/127 |
| | | | 340/989 |
| 2013/0289846 A1* | 10/2013 | Mitchell | G07C 5/08 |
| | | | 701/99 |
| 2013/0289873 A1* | 10/2013 | Mitchell | G06Q 10/08 |
| | | | 701/482 |
| 2014/0226010 A1* | 8/2014 | Molin | G06Q 10/06 |
| | | | 348/148 |
| 2014/0277905 A1* | 9/2014 | Anderson | G06Q 10/063114 |
| | | | 701/29.3 |
| 2015/0081399 A1* | 3/2015 | Mitchell | G08G 1/0129 |
| | | | 705/7.38 |
| 2015/0161828 A1* | 6/2015 | Davidson | G06Q 10/06398 |
| | | | 701/99 |

* cited by examiner

DRIVER PERFORMANCE - BEFORE (A1)

DATE RANGE [NOV 01, 2010 ▽] [NOV 18, 2010 ▽]  ⎯ 406

⊠ EXPORT TO CSV

| DRIVER | % PRODUCTIVE | CUSTOMER/SITE VISITS PER DAY | CUSTOMER/SITE VISIT DURATION | DAILY TRAVEL TIME | COST PER CUSTOMER/SITE VISIT | ENGINE IDLING TIME | OFFICE/WAREHOUSE VISITS PER DAY | OFFICE/WAREHOUSE VISIT DURATION | COST PER OFFICE/WAREHOUSE VISIT | SUPPLIER/VENDOR VISITS PER DAY | SUPPLIER/VENDOR VISIT DURATION | SUPPLIER/VENDOR COST PER VISIT | OTHER VISITS PER DAY | OTHER VISIT DURATION | OTHER COST PER VISIT |
|---|---|---|---|---|---|---|---|---|---|---|---|---|---|---|---|
| A. SCOTT | 85.2% | 6.7 | 00:19 | 2.1H | $73.51 | 1.1H | 0.0 | 00:00 | $0.00 | 0.4 | 00:19 | $86.36 | 0.4 | 00:19 | $67.83 |
| C. BURNETT | 77.7% | 6.2 | 00:19 | 2.1H | $73.24 | 1.0H | 0.0 | 00:00 | $0.00 | 0.4 | 00:19 | $55.63 | 0.9 | 00:18 | $72.86 |
| R. RIDGEWAY | 78.7% | 5.7 | 00:19 | 2.0H | $74.06 | 1.0H | 0.0 | 00:00 | $0.00 | 0.4 | 00:20 | $62.54 | 1.1 | 00:19 | $67.32 |
| R. FERRERO | 77.9% | 5.7 | 00:19 | 2.0H | $76.28 | 1.0H | 0.1 | 00:23 | $0.00 | 0.1 | 00:18 | $106.70 | 0.9 | 00:17 | $77.12 |
| E. CERVANTES | 77.5% | 5.7 | 00:19 | 2.1H | $77.52 | 1.0H | 0.1 | 00:23 | $0.00 | 0.1 | 00:18 | $56.46 | 0.9 | 00:17 | $77.67 |

*FIG. 4D*

DEMO_CORP / DEMO_REGION / COLORADO
DRIVERS

| DASHBOARD | BRANCH INFO | VEHICLE LIST | DRIVER LIST | POINTS OF INTEREST | GOALS | IMPORT |

WELCOME, BLUE 2 / TENANT LIST / EDIT TENANT / HELP / LOGOUT

SEARCH [ALL FIELDS ▼] FOR [        ]

DRIVERS ↙ 504

| NAME ▲ | ID | ASSIGNED VEHICLE | COST MODEL | ASSIGNED BRANCH | |
|---|---|---|---|---|---|
| A. SCOTT | ID00009 | | DEMOCOSTS | BEFORE (A1) | EDIT |
| C. BURNETT | ID00006 | | DEMOCOSTS | BEFORE (A1) | EDIT |
| E. CERVANTES | ID00010 | | DEMOCOSTS | BEFORE (A1) | EDIT |
| R. FERRERO | ID00007 | | DEMOCOSTS | BEFORE (A1) | EDIT |
| R. RIDGEWAY | ID00008 | | DEMOCOSTS | BEFORE (A1) | EDIT |

5 FOUND

*FIG. 5C*

DEMO_CORP / DEMO_REGION / COLORADO
BEFORE (A1) / DRIVER: A. SCOTT

520 — DASHBOARD | BRANCH INFO | VEHICLE LIST | DRIVER LIST | POINTS OF INTEREST | GOALS | WELCOME, BLUE 2 / TENANT LIST / EDIT TENANT / HELP / LOGOUT | IMPORT

MAP
512 — WESTMINSTER, AURORA, DENVER, LAKEWOOD, LITTLETON

514 — PERFORMANCE

| | % PRODUCTIVE | CUSTOMER/SITE VISITS PER DAY | CUSTOMER/SITE VISIT DURATION | DAILY TRAVEL TIME | COST PER CUSTOMER/SITE VISIT | ENGINE IDLING TIME | OFFICE/WAREHOUSE VISITS PER DAY | OFFICE/WAREHOUSE VISIT DURATION | COST PER OFFICE/WAREHOUSE VISIT | SUPPLIER/VENDOR VISITS PER DAY | SUPPLIER/VENDOR VISIT DURATION | SUPPLIER/VENDOR COST PER VISIT | OTHER VISITS PER DAY | OTHER VISIT DURATION | OTHER COST PER VISIT |
|---|---|---|---|---|---|---|---|---|---|---|---|---|---|---|---|
| YESTERDAY | 87.2% | 7.0 | 00:20 | 2.1H | $45.86 | 1.0H | 0.0 | 00:00 | $0.00 | 0.0 | 00:00 | $0.00 | 0.0 | 00:00 | $0.00 |
| LAST WEEK | 79.3% | 6.8 | 00:19 | 2.2H | $73.40 | 1.1H | 0.0 | 00:00 | $0.00 | 0.7 | 00:19 | $90.34 | 0.7 | 00:20 | $60.71 |
| MONTH TO DATE | 85.2% | 6.7 | 00:19 | 2.1H | $73.51 | 1.1H | 0.0 | 00:00 | $0.00 | 0.4 | 00:19 | $86.36 | 0.4 | 00:19 | $67.83 |
| LAST MONTH | 81.9% | 6.1 | 00:19 | 2.1H | $40.91 | 1.1H | 0.0 | 00:00 | $0.00 | 0.4 | 00:20 | $45.71 | 0.7 | 00:20 | $62.80 |
| QUARTER TO DATE | 83.2% | 6.3 | 00:19 | 2.1H | $53.24 | 1.1H | 0.0 | 00:00 | $0.00 | 0.4 | 00:19 | $58.54 | 0.6 | 00:20 | $63.92 |
| LAST QUARTER | 0.0% | 0.0 | 00:00 | 0.0H | $0.00 | 0.0H | 0.0 | 00:00 | $0.00 | 0.0 | 00:00 | $0.00 | 0.0 | 00:00 | $0.00 |

ALERTS
CREATE | ARCHIVE | ARCHIVE ALL
TODAY — 0 TOTAL
YESTERDAY — 0 TOTAL
516 — NOV 17 — 0 TOTAL
NOV 16 — 0 TOTAL
VIEW ALL ALERTS

DAILY ACTIVITY
7:00 AM MST — 6:00 PM MST
18 NOV 2010
17 NOV 2010
16 NOV 2010
15 NOV 2010
14 NOV 2010
13 NOV 2010
12 NOV 2010

COST PER VISIT
LAST 30 DAYS

| | SHARE | COST | GOAL |
|---|---|---|---|
| ○ CUSTOMERS | 72% | $71.31 | $15.00 |
| WAREHOUSES | 0% | $0.00 | $0.00 |
| OFFICE/SUPPLIERS | 6% | $82.05 | |
| OTHER | 9% | $80.88 | |

*FIG. 5D*

DEMO_CORP / DEMO_REGION / COLORADO

POINTS OF INTEREST

WELCOME, BLUE 2 / TENANT LIST / EDIT TENANT / HELP / LOGOUT

| DASHBOARD | BRANCH INFO | VEHICLE LIST | DRIVER LIST | POINTS OF INTERST | GOALS | IMPORT |

SEARCH [ALL FIELDS ▼] FOR [_____] INCLUDE GPS POINTS ☐

POIS

| NAME | POINT ID | POI TYPE | START/END | TAG | ADDRESS | VISITS |
|---|---|---|---|---|---|---|
| CUST #15272 | POI_CH_A2_101015_00272 | CUSTOMER | N | | 1388 M STREET, CITY F | 26 |
| CUST #15273 | POI_CH_A2_101015_00273 | CUSTOMER | N | | 11395 N COUNTY RD 17, FORT COLLINS, CO 8052 | 32 |
| CUST #15274 | POI_CH_A2_101015_00274 | CUSTOMER | N | | 44000-44486 COUNTY RD 15, FORT COLLINS, CO | 26 |
| OFFICE #15275 | POI_CH_A2_101015_00275 | OFFICE/SUPPLIER | N | | 11415-11499 RD 8, SIDNEY, NE 69162, USA | 31 |
| CUST #15276 | POI_CH_A2_101015_00276 | CUSTOMER | N | | 7777 COUNTY RD 32C, LOVELAND, CO 80538, US | 18 |
| CUST #15277 | POI_CH_A2_101015_00277 | CUSTOMER | N | | | 29 |
| POI #15278 | POI_CH_A2_101015_00278 | UNKNOWN | N | | 125 N ELLICOTT HWY, CALHAN, CO 80808, USA | 16 |
| CUST #15279 | POI_CH_A2_101015_00279 | CUSTOMER | N | NAT ACT 7 | 24001-24223 COUNTRY RD 61, KERSEY, CO 80644 | 6 |
| POI #15280 | POI_CH_A2_101015_00280 | UNKNOWN | N | | 3301 S EMERSON ST, ENGLEWOOD, CO 80113, U | 41 |
| CUST #15281 | POI_CH_A2_101015_00281 | CUSTOMER | N | | 8601-8699 RD 8, SIDNEY, NE 69162, USA | 12 |
| OFFICE #15282 | POI_CH_A2_101015_00282 | OFFICE/SUPPLIER | Y | | 23097-23365 COUNTY RD 3, LOVELAND, CO 80537 | 41 |
| CUST #15283 | POI_CH_A2_101015_00283 | CUSTOMER | Y | | 59 N RANCH RD, LITTLETON, CO 80127, USA | 23 |
| CUST #15284 | POI_CH_A2_101015_00284 | OTHER | N | | | 10 |
| CUST #15285 | POI_CH_A2_101015_00285 | CUSTOMER | N | | | 12 |
| CUST #15286 | POI_CH_A2_101015_00286 | CUSTOMER | N | | 1689 E QUINCY AVE, ENGLEWOOD, CO 80113, US | 12 |

233 FOUND                                                                                      1 2 3 ... 16 / NEXT

*FIG. 5F*

DEMO_CORP / DEMO_REGION / COLORADO        WELCOME, BLUE 2 / TENANT LIST / EDIT TENANT / HELP / LOGOUT
CURRENT GOALS FOR BEFORE (A1)

| DASHBOARD | BRANCH INFO | VEHICLE LIST | DRIVER LIST | POINTS OF INTEREST | GOALS | IMPORT |

USE THIS PAGE TO SET THE GOALS FOR THE DRIVER AT THIS LEVEL OR BRANCH. THESE VALUES CONTROL THE RED AND GREEN INDICATORS ON THE DASHBOARD AND ALLOW THE SYSTEM TO CALL YOUR ATTENTION TO OVER-AND-UNDER PERFORMING AREAS.

PRODUCTIVITY            70% (HIGHER IS BETTER) / EDIT
                        OCTOBER 5, 2010                                    JANUARY 3, 2011

CLICK A BOX TO SET, CHANGE, OR REMOVE A GOAL AS OF A SPECIFIC DATE.

CUSTOMER VISITS PER DAY     10.0 (HIGHER IS BETTER) EDIT
CUSTOMER VISIT DURATION     30 MIN (HIGHER IS BETTER) EDIT
TIME SPENT AT CUSTOMER      4.0H (HIGHER IS BETTER) EDIT
TRAVEL TIME PER DAY         1.3H (LOWER IS BETTER) EDIT
CO2 EMISSIONS PER DAY       - EDIT

CUSTOMER COST PER VISIT     $15 (LOWER IS BETTER) EDIT
WAREHOUSE COST PER VISIT    - EDIT
ENGINE IDLING PER DAY       - EDIT

FIG. 5G

DEMO_CORP / DEMO_REGION / COLORADO
DEMO_CORP-01 SETTINGS

WELCOME, BLUE 2 / TENANT LIST / HELP / LOGOUT

| DASHBOARD | BRANCH INFO | VEHICLE LIST | DRIVER LIST | POINTS OF INTEREST | GOALS | IMPORT |

BRANDING

| CURRENT LOGO | UPLOAD A LOGO |
|---|---|
| ⊙ POINTSERVE | [BROWSE] [UPLOAD] |

PRODUCTIVE TIME
WHICH OF THESE ACTIVITIES ARE CONSIDERED PRODUCTIVE?

☑ CUSTOMER TRAVEL
☐ DEPOT TRAVEL
☐ VENDOR TRAVEL
☑ CUSTOMER VISIT
☐ DEPOT VISIT
☐ VENDOR VISIT

TERMINOLOGY (SINGULAR FORM)

| ALERT | ALERTS |
| CUSTOMER | CUSTOMER |
| DEPOT | WAREHOUSE |
| DRIVER | DRIVER |
| OFFICE/SUPPLIER | OFFICE/SUPPLIER |
| OTHER | OTHER |

⊕ CREATE NEW

| TYPE ▲ | RULE | | |
|---|---|---|---|
| DRIVER AVERAGE PRODUCTIVE TIME LOW | DRIVER'S AVERAGE % PRODUCTIVE TIME WAS LESS THAN 40% OVER THE LAST THIRTY DAYS | EDIT | DELETE |
| DRIVER AVERAGE PRODUCTIVE TIME LOW | DRIVER'S AVERAGE % PRODUCTIVE TIME WAS LESS THAN 50% OVER THE LAST THIRTY DAYS | EDIT | DELETE |

2 FOUND
[SAVE]

SYSTEM AND METHOD FOR ANALYZING AND PRESENTING LOCATION AND LOCATION-RELATED DATA

RELATED APPLICATION

This application claims priority to, and the benefit of, U.S. Provisional Application Ser. No. 61/448,078, filed on Mar. 1, 2011, entitled "SYSTEM AND METHOD FOR ANALYZING AND PRESENTING LOCATION AND LOCATION-RELATED DATA," which is herein incorporated by reference in its entirety.

TECHNICAL FIELD

The invention relates generally to systems and methods that analyze location-related data, such as global positioning satellite (GPS) data, and present findings based on that analysis.

BACKGROUND

Location data, indicating the location of a vehicle, person, place or thing, is pervasive in today's world. Location data, primarily GPS data, is used to provide navigation instructions, track the movement of vehicles, persons or things, and for other related purposes. Software applications for analyzing this data and determining other information exist today. However, these applications are generally limited in the analysis they perform and the information that they present, at least because these applications do not provide users with metrics, trends and automated recommendations regarding overall business efficiency and cost-effective operations. Moreover, these applications do not present this information in a dynamic, configurable and intelligent manner.

SUMMARY

An embodiment of a method is disclosed for analyzing and presenting location and location-related data. The method includes receiving raw location data of a subject being tracked, identifying stops of the subject being tracked based on the raw location data, correlating the identified stops with know points of interests (POIs), creating a trips file using the raw location data, the identified stops, and the correlated information, extracting and processing data in the trips file, generating processed location-related data and other data, determining an analysis to perform based on the trips file, performing the determined analysis on the processed location-related data and other data to generate one or more results, and forwarding the results of the analysis to a client platform to generate a dashboard or other display to be displayed.

An embodiment of a system is disclosed for analyzing and presenting location and location-related data. The system includes an external data source application programming interface (API) that receives raw location data of a subject being tracked, and a core analytical functionality module that identifies stops of the subject being tracked based on the raw location data, correlates the identified stops with know points of interests (POIs), creates a trips file using the raw location data, the identified stops, and the correlated information, extracts and processes data in the trips file, generating processed location-related data and other data, determines an analysis to perform based on the trips file, performs the determined analysis on the processed location-related data and other data to generate one or more results, and forwards the results of the analysis to a client platform to generate a dashboard or other display to be displayed.

An embodiment of a non-transitory computer readable medium providing instructions for analyzing and presenting location and location-related data is disclosed. The instructions include receiving raw location data of a subject being tracked, identifying stops of the subject being tracked based on the raw location data, correlating the identified stops with know points of interests (POIs), creating a trips file using the raw location data, the identified stops, and the correlated information, extracting and processing data in the trips file, generating processed location-related data and other data, determining an analysis to perform based on the trips file, performing the determined analysis on the processed location-related data and other data to generate one or more results, and forwarding the results of the analysis to a client platform to generate a dashboard or other display to be displayed.

DETAILED DESCRIPTION DRAWINGS

The detailed description will refer to the following drawings, wherein like numerals refer to like elements, and wherein:

FIGS. 3A-3D are screen-shots illustrating embodiments of dashboard displaying location-related data and analytics generated by an embodiment of a system for analyzing and presenting location-related data and analytics based on the analysis.

FIGS. 4A-4E are screen-shots illustrating embodiments of various pages displaying location-related data and analytics generated by an embodiment of a system for analyzing and presenting location-related data and analytics based on the analysis.

FIGS. 5A-5I are screen-shots illustrating embodiments of various pages displaying location-related data and analytics generated by an embodiment of a system for analyzing and presenting location-related data and analytics based on the analysis.

DETAILED DESCRIPTION

Figure 1:
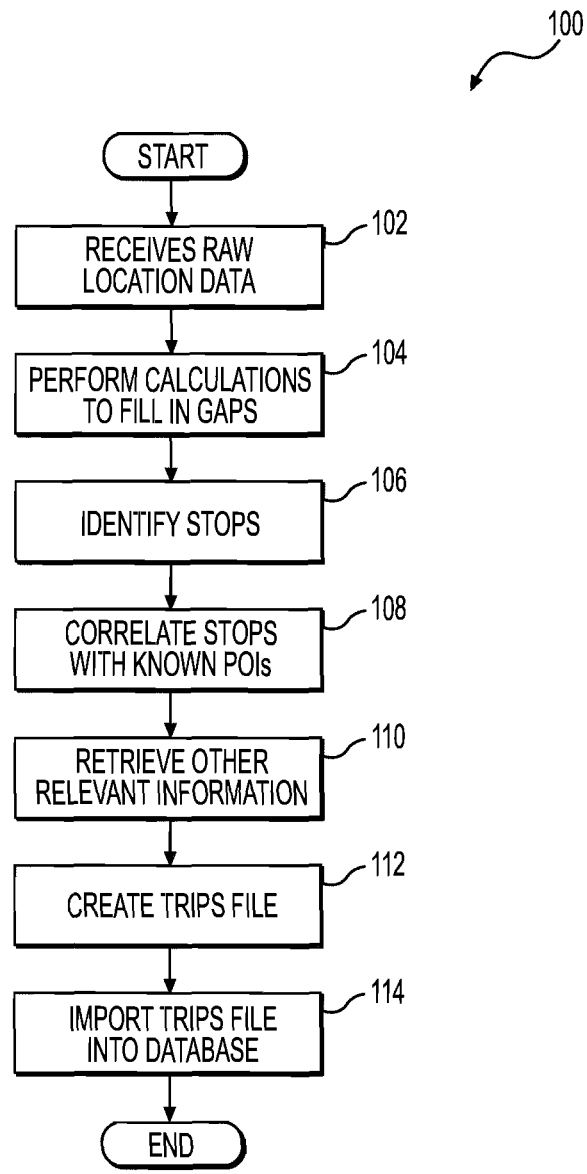
FIG. 1 is a flowchart illustrating an embodiment of a method for analyzing and presenting location-related data and analytics based on the analysis.

Described herein are embodiments of a system and method for analyzing location-related data and presenting location-related data and analytics based on or resulting from the analysis. The embodiments described herein, as shown in the drawings, present this data in a dynamic, configurable and intelligent manner that is readily usable by, e.g., managers to take immediate action. The data shown is presented in an easy-to-use manner. The data presented provides an organization or enterprise performance information determined from the location-related data.

The embodiments described herein overcome disadvantages of the prior art, by, for example:

- Deriving customer satisfaction metrics (e.g., "Didn't do a thorough job") from the basic time-and-distance global positioning satellite (GPS) measurements;
- Identifying the best-overall performing Branches and Drivers, independent of the effects of geography and mix of service types;
- Identifying specific customers whose cost-of-service is excessive or is an outlier to the norm;
- Providing comparisons with other companies whose operating conditions are similar (e.g., "Another company, in a similarly-congested city, is achieving an average of only 1.2 miles per customer visit");
- Making automated recommendations of managerial policy and procedure adjustments (e.g., "re-assign the customer from Route A to Route B and change the visit days from Mondays to Tuesdays," or "increase the monetary penalty on out-sourced labor for late arrivals—in-house staff consistently out-performs them on this metric");
- Identifying the causes of variance between planned (or expected) measurements and the actual measurements (e.g., "Compare Planned vs. Actual Performance," for example, "Job durations are planned to be 30 minutes—the statistical mean is 43 minutes"); and
- Making these indicators (expressed in terms of common business performance measures) available to managers via an easily-accessed management-by-exception dashboard.

Moreover, the data, metrics, analysis and recommendations described herein may be analyzed and presented differently for different levels of an organization or enterprise. For example, the most important metrics for a branch manager may be equalized revenue across the staff, while a regional manager is likely to be concerned more with customer service and total costs. Often, the goals a manager is measured against vary by organizational level. In this manner, the organization or enterprise can view the performance of different levels of the organization or enterprise against the same or different goals. For example, an enterprise may view performance data that is derived from location-related data at the enterprise (e.g., company), region, state, franchise or branch (local) or employee (e.g., driver) level. In this manner, the enterprise may pinpoint performance problems. Embodiments of the system are designed to highlight statistical outliers and top- and worst-performers.

It is noted that the examples described below refer to "branch" and "branches" and "driver" and "drivers." It should be understand that other examples may substitute the most local location level of a given enterprise for branch and may substitute the local level employee or employees whose performance an enterprise tracks to determine productivity, etc. for driver. Accordingly, the embodiments described herein may be used by virtually any enterprise, regardless of whether the enterprise tracks driver performance or other employee performance, refers to its local locations as branches, franchises, offices, etc.

With reference now to FIG. 1, shown is a flowchart illustrating a process 100 for analyzing location-related data. The process 100 shown imports and analyzes location-related data and is performed by embodiments of a system and method for analyzing and presenting location and location-related data. In the embodiment shown here, the location-related data is GPS data. Indeed, throughout this application, the location-related data discussed is GPS data. It is to be understood, however, that other location-related data may be used by the embodiments described herein. The process 100 receives raw location data, including raw GPS data, of a subject, such as a vehicle, person or thing, being tracked, block 102. The raw location data indicates where the subject, such as vehicle, person or thing, is located at a given moment in time. Raw location data typically includes both location-related data (e.g., indicated by longitude and latitude) and a time-stamp. The raw location data may also include information indicating vehicle status, such as whether the vehicle engine was turned on or off or whether engine was idling at a location.

The raw location data may be received from standard systems that calculate and transmit GPS data. For example, the GPS data may be calculated by a GPS tracker installed on a vehicle used by a driver for an enterprise. The GPS tracker receives GPS information, including raw GPS data, from a GPS satellite. The GPS tracker may transmit, e.g., wirelessly over a telecommunications network, the calculated GPS data to a server of an embodiment of the system.

The raw location data may be provided by automatic vehicle location ("AVL") systems and methods. AVL systems and methods may be provided by third-party vendors. AVL systems may present raw location data in a proprietary format. Accordingly, receiving 102 the raw location data may include transforming the raw location data (e.g., AVL data) from a vendor or other format.

Often times, there are gaps in the received raw location data. For example, there may have been a transmission or calculation error. Likewise, the GPS tracker may have been blocked from receiving a GPS satellite signal. Accordingly, the process 100 may perform calculations to fill in gaps in the raw location data, block 104. The calculations may include extrapolating positions of a subject being tracked, e.g., a vehicle, based on surrounding, known GPS data or other sources of location-related data. For example, if the vehicle was known to be at point X at time 1 and point Z at time 3, process 100 may calculate that only or most reasonable path would have taken vehicle through point Y at time 2. The process 100 identifies stops of the subject, such as vehicle, person or thing, being tracked, block 106. Stops may be identified 106 by determining when the subject being tracked, e.g., vehicle, did not move. The raw location data received will typically include a time stamp. Likewise, the raw location data will typically be transmitted at regular intervals. Accordingly, if the raw location data indicates the subject being tracked, e.g., vehicle, is at the same position over a period of time, process 100 may identify that period of time as stop. A minimum threshold period of time may be set so as to avoid identifying ordinary traffic stops (e.g., red lights) as stops. Likewise, stops may be identified 106 by determining from received 102 data whether vehicle engine was off or whether vehicle simply idling at a location. Such information enables process 100 to determine whether the subject being tracked, e.g., vehicle, was visiting a location or merely passing through. Other algorithms to determine what were actually subject, e.g., vehicle, stops for location visits may be used. Identifying 106 stops may include determining and recording the time spent at the stop.

With continuing reference to FIG. 1, the process 100 correlates the identified stops with known points of interests (POIs), block 108. The known POIs may have been input by a user into an embodiment of the system for analyzing and presenting location and location-related data. Alternatively, an embodiment may upload POIs from a file or other source.

POIs may be customer locations, franchises, warehouses, vendor locations, maintenance facilities, etc. Other algorithms for correlating identified stops with POIs may be used. By correlating 108 identified stops with known POIs, process 100 may determine where a vehicle has visited (e.g., the customer locations, franchises, warehouses, vendor locations, maintenance facilities, etc. that vehicle has stopped at). If a driver or other employee is assigned to the vehicle, this correlation 108 also enables embodiments to correlate the driver/employee with the POIs and to determine what POIs the driver/employee has visited. Likewise, if it is known that an employee made or planned to make a visit or visits to certain POIs, the vehicle driver (or at least a vehicle passenger if multiple employees are in each vehicle) may be determined by correlating the vehicle POI visits and the employee's POI visits. If an employee is determined or known to have driven a certain vehicle, the correlation of the vehicle POI visits to the employee's planned POI visits enables embodiments to derive and display metrics and analytics related to planned versus actual that may be used to measure employee performance, as described herein.

In an embodiment, a method for determining the person (s) driving or riding in a vehicle by correlating 108 location-related data gathered from GPS-enabled mobile devices (e.g., cell phones) associated with those people and location-related data of GPS-enabled vehicles may include:

1. Recording the locations of the mobile devices at several points in time;
2. Recording the locations of the vehicles at several points in time, not necessarily time-synchronized with the mobile device locations;
3. Employing a mathematical process to determine pairings between mobile devices and vehicles which correspond to each other by similar movement patterns and locations over the measurement period;
4. Storing the pairings of mobile devices and vehicles; and
5. Displaying the pairings of mobile devices and vehicles.

Embodiments of process 100 may retrieve other relevant information including driver information (e.g., who is the assigned driver for the vehicle), vehicle data (e.g., type of vehicle, gas mileage, average fuel costs, etc.), costs (e.g., average costs associate with POI visits), and to which level(s) of organization or enterprise data applies, block 110. Process 100 then may create a trips file, block 112. In embodiments, the trips file is created 112 from information and data determined, calculated and retrieved as described in blocks 102-110. In other word, the trips file includes the identified route of the vehicle, the vehicle stops, the length of vehicle stops, the POIs corresponding to stops of the vehicle, driver information, vehicle information, cost information, what level(s) apply, etc. Process 100 may import the trips file into database or server maintained by system, block 114. Embodiments of system and method may use the trips file as the basic input data to create higher-value business and operational analytics, as described herein.

Figure 2:
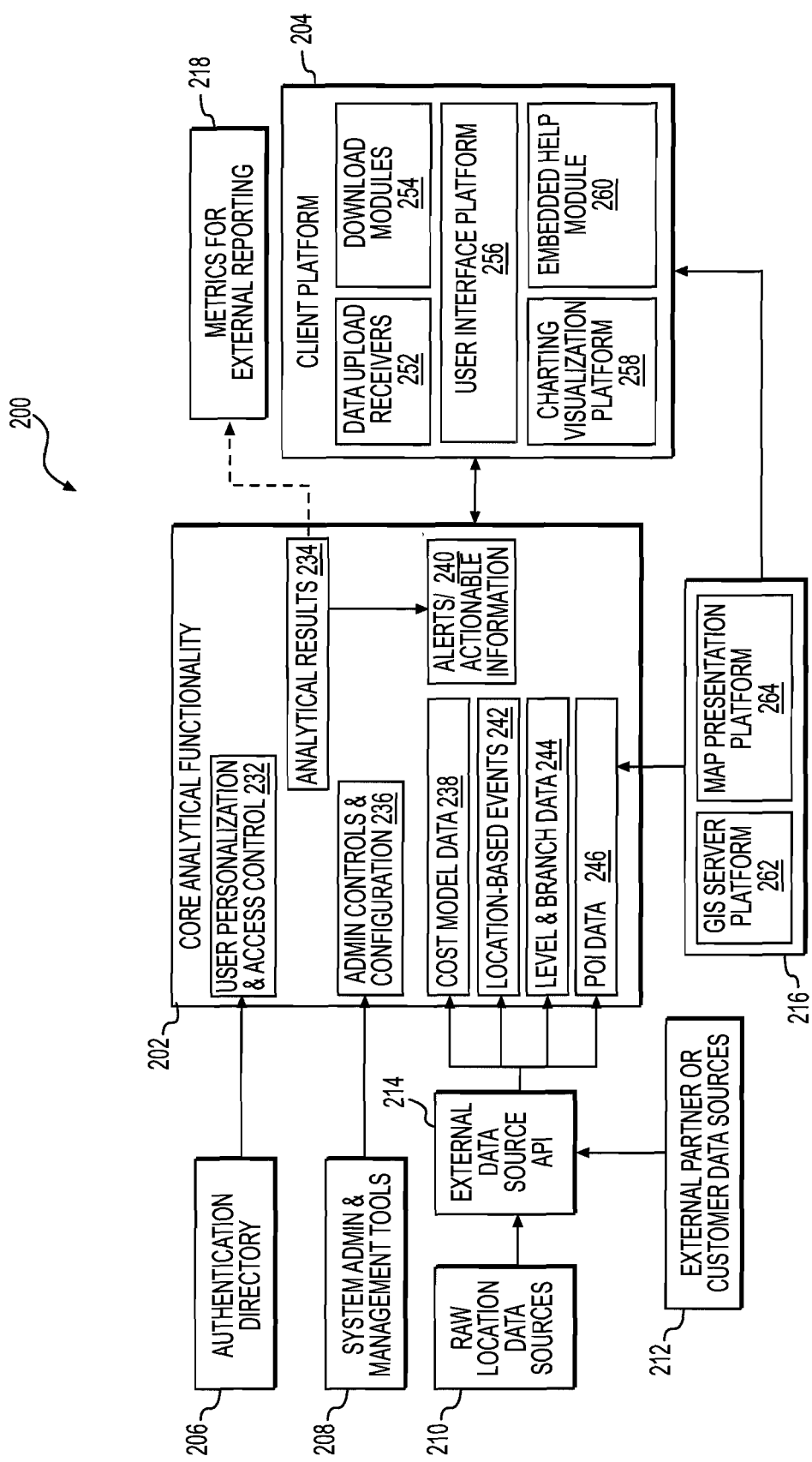
FIG. 2 is a block diagram illustrating an architecture of an embodiment of a system for analyzing and presenting location-related data and analytics based on the analysis.

With reference now to FIG. 2, shown is a block diagram illustrating an architecture of an embodiment of system 200 for analyzing location-related data and presenting location-related data and analytics based on or resulting from the analysis. A number of architectural components are included and support embodiment of system 200. The architecture shown illustrates how an embodiment of system 200 organizes and processes data to provide the analysis and present the resulting analytics and other data. System 200 includes core analytical functionality 202, client platform 204, authentication directory 206, administration and management tools 208, raw location data sources 210, external partner/customer data sources 212, external data source application programming interface (API) 214 and geographical information server (GIS)/map presentation platform 216. Core analytical functionality 202 may be embodied as a database and web server and may include a number of modules, or other software sub-components, for performing various analytical functions. For example, core analytical functionality 202 may include modules for extracting and processing data, such as cost model data 238, location-based events 242 (such as "AVL events" and visits to POIs), level and branch data 244, and POI data 246, from trips files received from raw location data sources 210 and external partner/customer data sources 212 through external data source API 214. Core analytical functionality 202 may also include modules for applying metrics to and otherwise performing analysis on the extracted and processed data to generate analytical results 234 (also referred to as metrics or analytics).

Core analytical functionality 202 may also include modules for generating alerts and actionable information 240 from the analytical results 234. The alerts and actionable information 240 may direct the user to the business consequences of the measured values. Accordingly, the alerts and actionable information 240 may be directed toward policy changes and managerial decision-making. Likewise, core analytical functionality 202 may include modules for user personalization and access control 232 and administrative controls and configuration 236. Administrative controls and configuration 236 enable system 200 to be configured for specific tenants/customers. For example, system 200 may be configured to present dashboards for all of the levels of an enterprise or only a subset of the levels. Likewise, the dashboards for each level may be configured per customer requirements.

Core analytical functionality 202 generally outputs its analytical results 234, and alerts and actionable information 240 to client platform 204. Client platform 204 generally runs on user clients and generates dashboard (see FIGURES below) that graphically displays the analytical results 234, and alerts and actionable information 240. Accordingly, client platform 204 presents location-related data and analytical results 234 based on or resulting from the analysis. Accordingly, client platform 204 may include a number of modules or other software sub-components for generating dashboard. For example, such modules may include a user interface platform 256 and charting/visualization platform 258. Client platform 204 may also include data upload receivers 252 to upload data from core analytical functionality 202 (or other sources). Client platform 204 may also include an embedded help module 260 and download modules 254 (e.g., to download charts and tables to MS Excel™ files).

With continuing reference to FIG. 2, GIS server/map presentation platform 216 supports POI data processing of core analytical functionality 202 and generation of charts and visualization by client platform 204. Specifically, GIS server/map presentation platform 216, which includes GIS server platform 262 and map presentation platform 264, may enable generation of maps illustrating POI data 246, driver and vehicle route data derived from location-related data, analytics derived from the correlation of this data and other data, such as cost model data 238, and other information as illustrated herein. GIS server/map presentation platform 216 may be provided by one or more existing third-party GIS applications.

Raw location data sources 210 and external partner/customer data sources 212 may provide raw location data (e.g., GPS data) and other relevant data, such as POI, cost information, levels of enterprise that apply, driver and vehicle data, as discussed above (e.g., see blocks 102 and 110 of process 100). External data source API 214 may execute process 100, specifically executing blocks 102-112 to process raw location data, correlate location-related data and generate trips files.

Authentication directory 206 supports user access control (login) and personalization functionality. Administration and management tools 208 support administration control and configuration functionality.

With continuing reference to FIG. 2, system 200 may also include external reporting metrics functionality 218. External reporting metrics 218 may support reporting of analytics through e-mails, text messages, web-page postings, etc. External reporting metrics 218 may receive analytical results 234 from core analytical functionality 202, as shown, and process the analytical results 234 in necessary formats for external reporting.

Figure 3A:
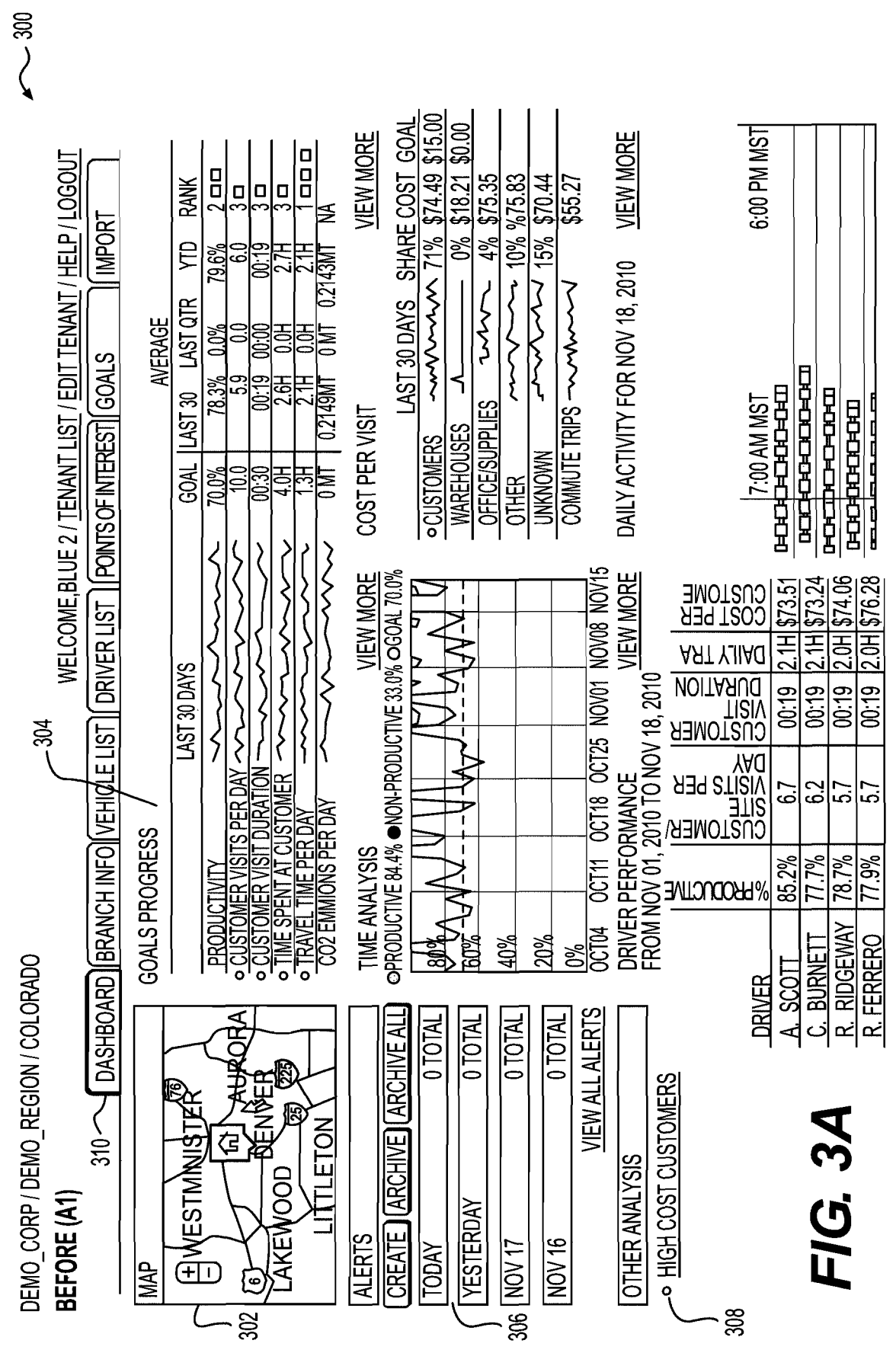

With reference now to FIG. 3A, shown is a screenshot illustrating an embodiment of dashboard 300, which may be generated by system 200 (e.g., by client platform 204) as described above. As shown, dashboard 300 presents location-related data and analytical data (analytics) generated using location-related data (e.g., Goals Progress, Time Analysis (amount of time productive), Cost per visit, Driver Performance, Daily Activity, and Alerts). The location-related data may be extracted from the trips files described above, for example. The dashboard 300 shown is for a branch (a single location) and, therefore, is a branch-level dashboard. Branch dashboard 300 may provide analytics for a given enterprise (or other single location of the enterprise). System 200 may extract the location-related data and other data from the trips file and perform analysis to generate analytical results 234 requested to display branch (and other) dashboard 300. System 200 may also (e.g., continuously) extract, perform and update this analysis in the background, displaying only as requested. Branch dashboard 300 includes a map 302 that illustrates the branch location and the surrounding area. Dashboard map 302 may also illustrate other POI locations, POI density, other branch locations, warehouse locations, and visit density. Branch dashboard 300 may also include a number of graphs, tables or charts illustrating analytics 304. For example, analytics 304 on branch dashboard 300 may include a chart/table illustrating the branch's progress in meeting goals (e.g., the Goals Progress). The metrics analyzed and specific values determining whether the goals are met may be pre-set or they may be customized by an enterprise user (e.g., by a district or branch manager or higher level administrator). Goals progress may include numeric values indicating goals and actual performance. Goals progress may also include color dots or other graphics visually indicating whether goals are being met. Goals progress may also include a graph for each goals metric that charts actual performance over time (e.g., last 30 days). The graphs may have dots indicating minimum, maximum and/or final values of that metric over the time period. Likewise, analytics 304 on branch dashboard 300 may include a graph illustrating the percent of time the branch's drivers are productive or non-productive (e.g., the Time Analysis). This illustrates the branch's overall productivity. What is considered productive time versus what is considered to be non-productive time may be pre-set or they may be customized by the enterprise. For example, productive time may be defined to include time spent by a driver at a customer location, while non-productive time may be defined to include time spent idling at a non-customer, non-enterprise location.

Analytics 304 on branch dashboard 300 may include a chart and table (e.g., the Cost per visit) illustrating the average costs per visit to various POIs (e.g., customer locations, warehouses, office/suppliers, commuting trips, other and unknown). The chart portion may graphically illustrate costs over a period of time (e.g., 30 days). The table may include the average cost, the percentage of those costs versus total costs, and the goal. The factors used in calculating the costs and the goals may be pre-set or they may be customized by the enterprise. The actual cost data used in calculating the costs may be downloaded from various outside sources or otherwise entered into the system 200 by the enterprise. Analytics 304 on branch dashboard 300 may also include a table providing details of individual driver's performance (e.g., the Driver Performance). This table may list each driver by name, the percent of time the driver was productive, the customer/site visits per day, customer/site visit duration average, the daily travel time average and the cost per customer/site visit. Analytics 304 on branch dashboard 300 may also include a bar graph or other graphic illustrating each driver's actual (or planned if looking forward) daily activity for a day (e.g., the Daily activity). For example, the bar graph may have a narrow black line for travel and different shaded strips for customer visits (light gray), warehouse visits (dark gray), office/supplier visits (medium gray) and unknown (black). The Daily activity may be determined directly from the analysis of the driver's location-related data as described above with reference to FIG. 1 (e.g., from determination of driver visits to POIs, length of those visits, time driver spent moving (driving), etc.).

With continuing reference to FIG. 3A, branch dashboard 300 may also list alerts 306 and have links to other analysis 308. Alerts 306 may include enterprise user-set alerts or system pre-set alerts. As is shown, branch dashboard 300 may enable user to create new alerts. An alert may be triggered by the analysis of some location-related data. For example, if branch productivity falls below a certain level, an alert may be triggered and displayed on the dashboard 300 in the alerts 306 section. System 200 may also be configured to communicate the alert to enterprise user through other means (e.g., e-mail alert, text message, etc.). The means of communicating the alert may be set-up when the alert is created by the enterprise user. Alerts 306 section may list the total number of alerts for a day (Today), the prior day (Yesterday), and other dates (e.g., November 17, November 16). The alerts 306 may also include an archive of older alerts. The other analysis 308 links may include a link to high cost customers, as shown.

Branch dashboard 300 may also include various tabs 310 corresponding to the specific branch, goal settings and for importing data. For example, there may be a dashboard tab which is selected to view the branch dashboard 300 and a branch info tab that is selected to view a page illustrating information about the branch. This page may allow the enterprise user to edit the branch information. There may be a tab for a vehicle list page, which may display the vehicles of the branch and which may be edited. There may be a tab for a driver list, which may display the drivers for the branch and which may be edited. Individual drivers may be selected on driver list to view a driver-specific dashboard. There may be a tab for a POI page, which may display the POIs near for the branch and which may be edited. There may be a tab for a goals page, which may display the goal settings for the branch, which may be edited. Finally, there may be an import tab for selecting and importing data for use by system 200 to generate the analytics and dashboard 300.

Figure 3B:
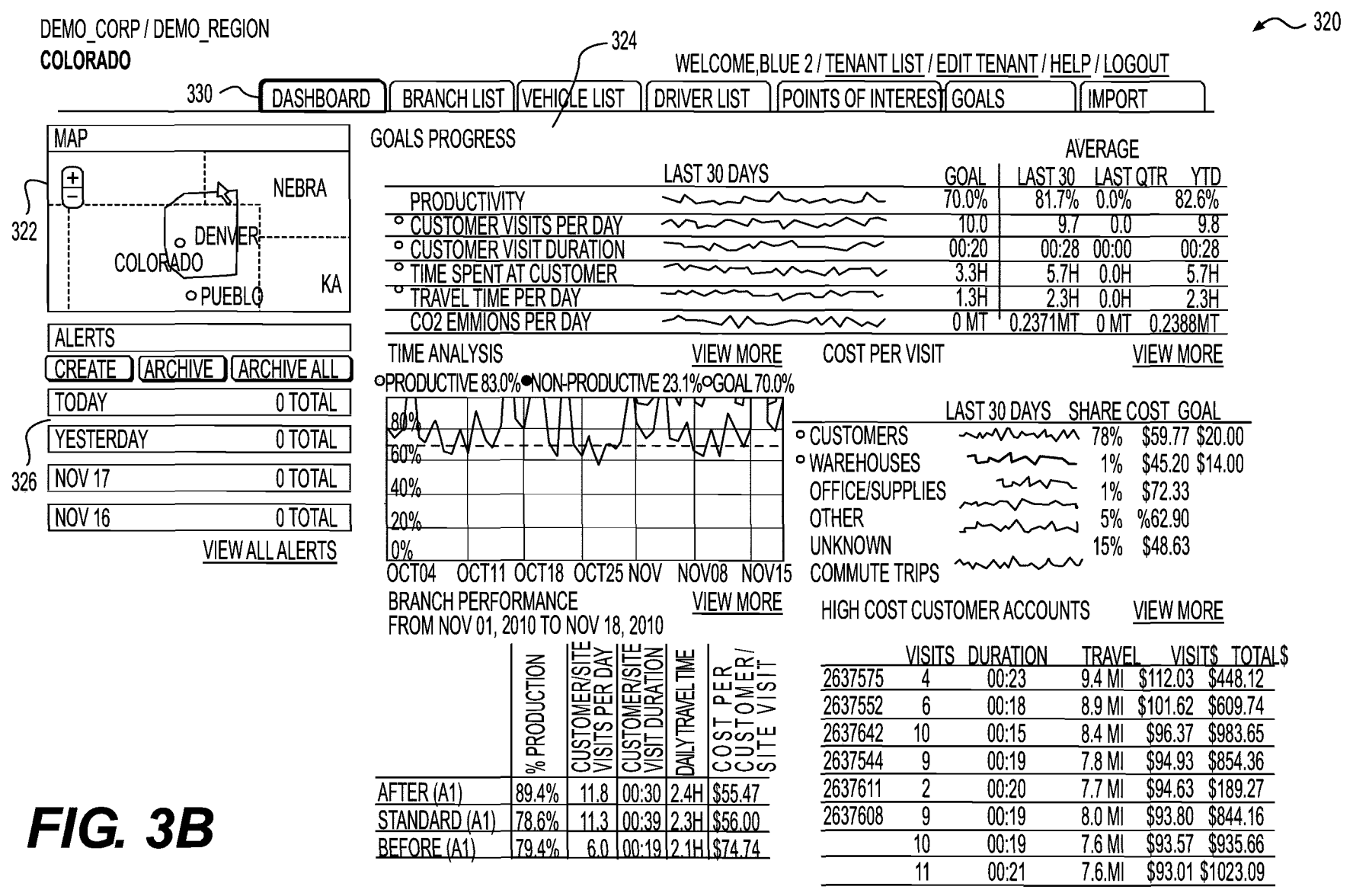

With reference now to FIG. 3B, shown is a screenshot illustrating an embodiment of a dashboard 320 for a state. State dashboard 320 presents location-related data and analytics generated using location-related data for all of the enterprise branches in a state. As such, state dashboard 320 may present similar information as the branch dashboard 300, although amalgamated for all the branches in the state. State dashboard 320 includes a map 322, similar to map 302, which may illustrate all of the branches in the state and other information. State dashboard 320 may also include analytics 324. As noted, analytics 324 may be similar to branch dashboard 300 analytics 304. For example, analytics 324 may include Goals Progress, Time Analysis and Cost per visit, all displaying the same or similar information as in analytics 302 above, but combined for all branches in the state. State dashboard 320 may not have individual driver performance or activity analytics. Rather analytics 324 may include a table providing details of individual branch's performance (e.g., the Branch Performance). This table may list each branch by name or id number, the percent of time the branch was productive, the customer/site visits per day, customer/site visit duration average, the daily travel time average and the cost per customer/site visit. The data for each branch may be the combined data of all of the branch's drivers. Analytics 324 may also include a table listing the highest costs customer accounts for the state (e.g., High Cost Customer Accounts). The High Cost Customer Accounts table may list each the highest costs customers, e.g., identified by customer number, the number of visits for the relevant time frame, the duration, travel amount, average visit cost and total costs (average visit cost×number of visits). Branch dashboard 300 analytics 304 may also include High Cost Customer Accounts table for the branch's customers.

State dashboard 320 may also include alerts 326, similar to alerts 306 described above. Likewise, state dashboard 320 may also include tabs 330 corresponding to various pages providing more information about branches in the state, etc. For example, tabs 330 may include dashboard tab which may be selected to view state dashboard 320 and a branch list tab which may be selected to view a page listing the branches in the state; individual branches may be selected to view a branch dashboard 300 corresponding to the selected branch. Tabs 330 may also include a vehicle list tab, for a vehicle list page for all vehicles in state, a driver list tab for a driver list page for all drivers in state, a POI tab for a POI page for all POIs in state, a goals tab, for a goals page, which may display the goal settings for the state, which may be edited, and an import tab, for importing data as above. Note, the goals set in the goals page for the state dashboard 320 may apply to all lower levels of the enterprise (e.g., for all branch dashboards 300 for branches in the state).

Figure 3C:
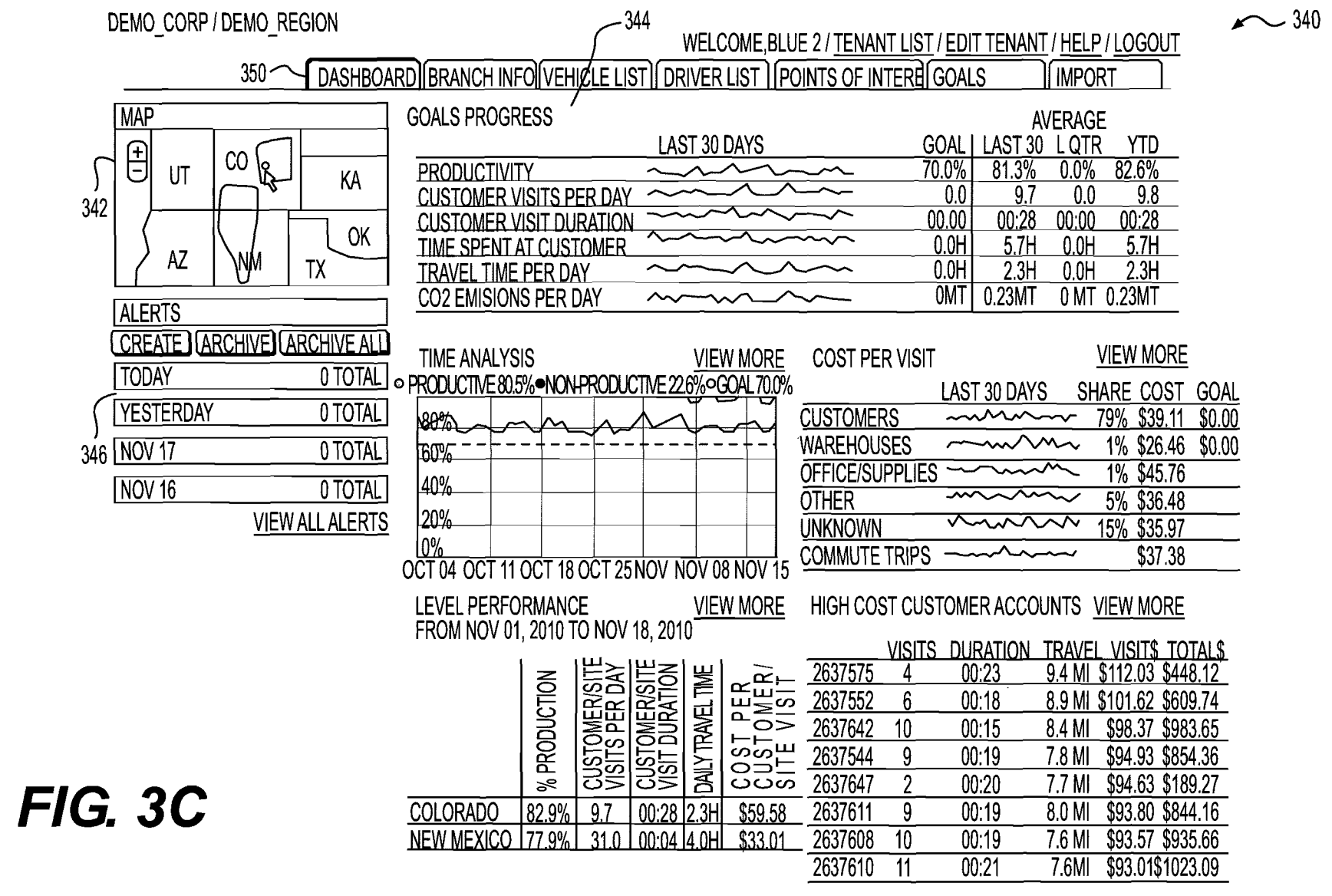

With reference now to FIG. 3C, shown is a screenshot illustrating an embodiment of dashboard 340 for a region. It is noted that an enterprise region may cover multiple states, a portion of a state or portions of a plurality of states. Accordingly, an enterprise region may be below the state level, above the state level or overlapping the state level. Region dashboard 340 displays location-related data and analytics generated using location-related data for all of the enterprise branches in an enterprise region. As such, region dashboard 340 may present similar information as the branch dashboard 300 and state dashboard 320, although amalgamated for all the branches in the region. Region dashboard 340 includes a map 342, similar to map 302 and 322, which may illustrate all of the branches in the region and other information. Region dashboard 340 may also include analytics 344 similar to branch analytics 304 and analytics 324. For example, analytics 344 may include Goals Progress, Time Analysis and Cost per visit, all displaying the same or similar information as in analytics 302 and 322 above, but combined for all branches in the region. Analytics 344 may also include High Cost Customer Accounts for the region. Moreover, analytics 344 may include a table providing details of the performance of each sub-level within the region (e.g., the Level Performance). This table may list each sub-level (e.g., state, sub-region or branch) by name, the percent of time the sub-level was productive, the customer/site visits per day, customer/site visit duration average, the daily travel time average and the cost per customer/site visit. The data for each sub-level may be the combined data of all of the sub-level's drivers.

Region dashboard 340 may also include alerts 346, similar to alerts 306 described above. Likewise, region dashboard 340 may also include tabs 350 corresponding to various pages providing more information about branches in the state, etc. For example, tabs 350 may include dashboard tab which may be selected to view region dashboard 340 and a branch list tab which may be selected to view a page listing the branches in the region; individual branches may be selected to view a branch dashboard 300 corresponding to the selected branch. Tabs 350 may also include a vehicle list tab, for a vehicle list page for all vehicles in region, a driver list tab for a driver list page for all drivers in region, a POI tab for a POI page for all POIs in region, a goals tab, for a goals page, which may display the goal settings for the region, which may be edited, and an import tab, for importing data as above. Note, the goals set in the goals page for the region dashboard 340 may apply to all lower levels of the enterprise (e.g., for all state dashboards 320 in the region and for all branch dashboards 300 for branches in the region).

Figure 3D:
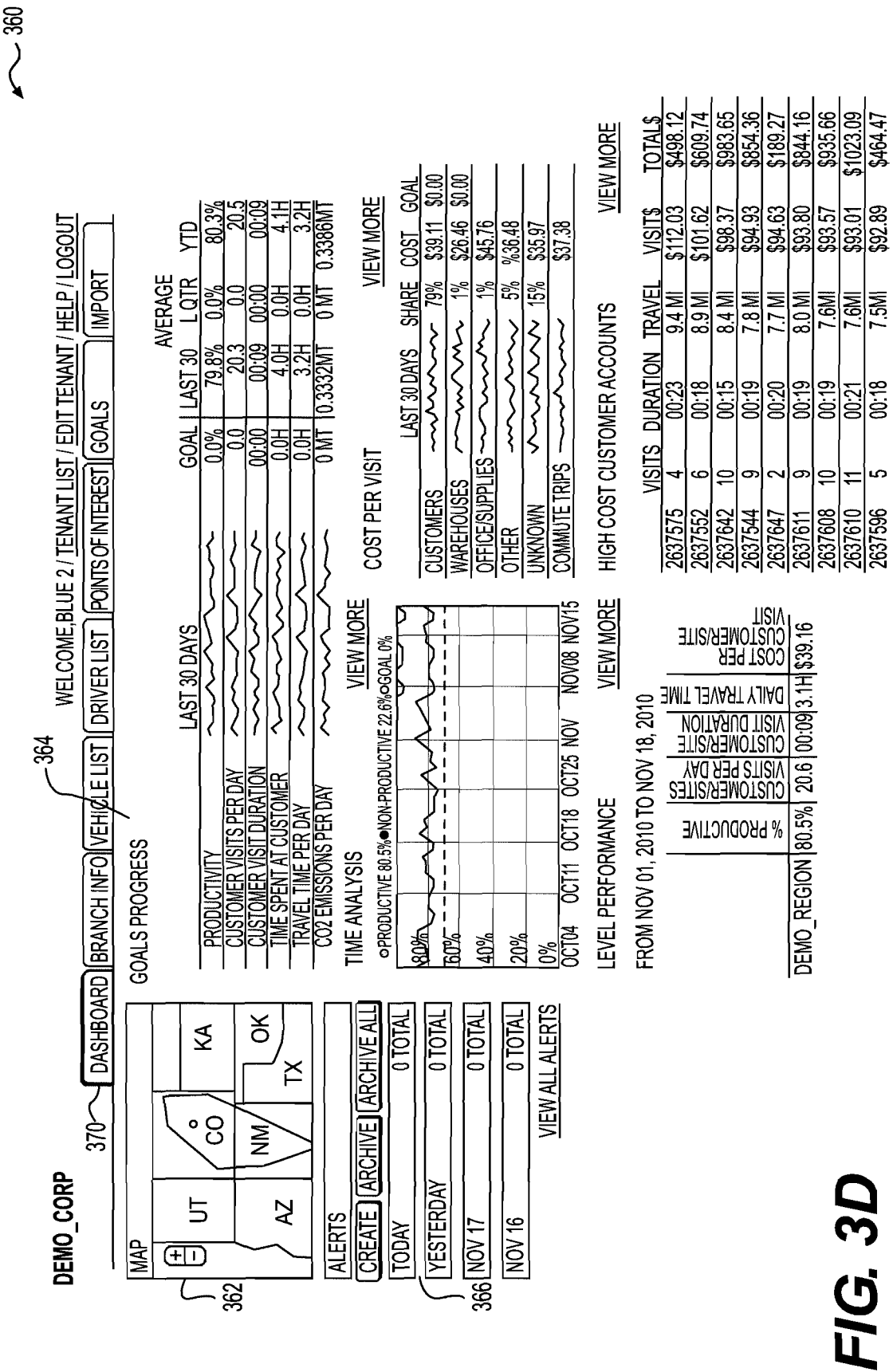

With reference now to FIG. 3D, shown is a screenshot illustrating an embodiment of dashboard 360 for an enterprise (e.g., the top level of an enterprise, such as a corporation). Enterprise dashboard 360 displays location-related data and analytics generated using location-related data for all of the enterprise regions, states and branches. As such, region dashboard 360 may present similar information as the branch dashboard 300, state dashboard 320, and region dashboard 340, although amalgamated for all the branches in the entire enterprise. Enterprise dashboard 360 includes a map 362, similar to maps 302, 322, and 342, which may illustrate all of the geographical reach of the enterprise, all of the branches in the enterprise and other information. Enterprise dashboard 360 may also include analytics 364 similar to analytics 304, 324 and 344. For example, analytics 364 may include Goals Progress, Time Analysis and Cost per visit, all displaying the same or similar information as in analytics 302 and 322 above, but combined for all branches in the region. Analytics 364 may also include High Cost Customer Accounts for the enterprise. Moreover, analytics 364 may include a table providing details of the performance of each sub-level within the enterprise (e.g., the Level Performance). This table may list each sub-level (e.g., region) by name, the percent of time the sub-level was productive, the customer/site visits per day, customer/site visit duration average, the daily travel time average and the cost per customer/site visit. The data for each sub-level may be the combined data of all of the sub-level's drivers.

Enterprise dashboard 360 may also include alerts 366, similar to alerts 306 described above. Likewise, enterprise dashboard 360 may also include tabs 370 corresponding to various pages providing more information about branches in the state, etc. For example, tabs 370 may include dashboard tab which may be selected to view enterprise dashboard 360 and a branch list tab which may be selected to view a page listing the branches in the enterprise; individual branches may be selected to view a branch dashboard 300 corresponding to the selected branch. Tabs 370 may also include a vehicle list tab, for a vehicle list page for all vehicles in enterprise, a driver list tab for a driver list page for all drivers in enterprise, a POI tab for a POI page for all POIs in enterprise, a goals tab, for a goals page, which may display the goal settings for the enterprise, which may be edited, and an import tab, for importing data as above. Note, the goals set in the goals page for the enterprise dashboard 360 may apply to all lower levels of the enterprise (e.g., for all region dashboards 340, state dashboards 320, and branch dashboards 300 in the enterprise).

Figure 4A:
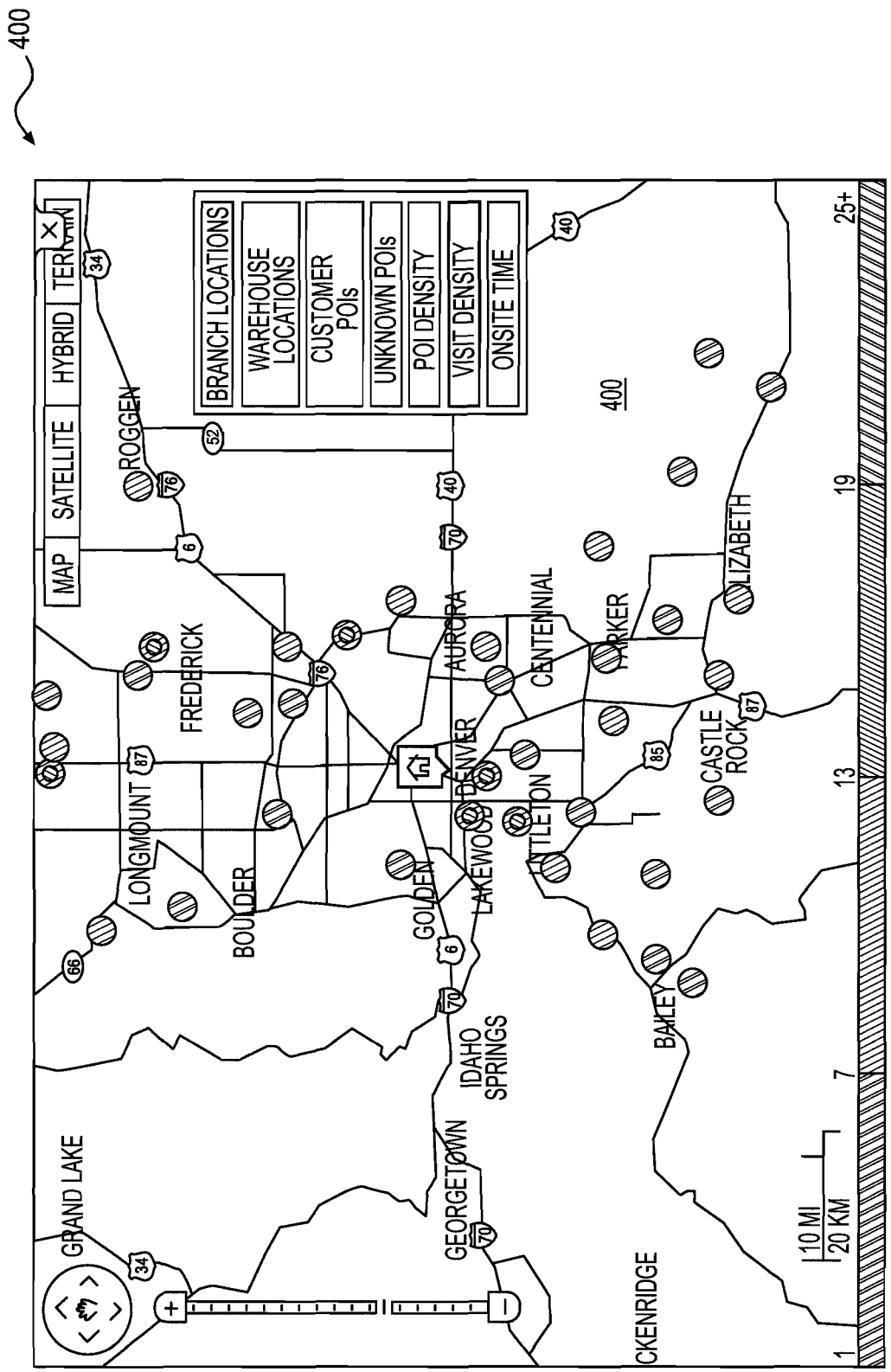

With reference now to FIG. 4A, shown is a screenshot illustrating a branch dashboard map 400. Map 400, which may be generated using GIS/map presentation platform 214, may be based on a Google™ map or other similar mapping application map. The map 400 shown may be displayed by clicking on the map 302 on dashboard 300, or otherwise selecting map 302 for display. Map 400 shows map 302 in greater detail and with additional selections of data for display made available. Similar maps may be displayed by clicking on other maps 322, 342 and 362. As shown, map 400 may illustrate the branch location (icon near center of map), other branch locations (only tab shown), warehouse locations (only tab shown), customer POIs (only tab shown), unknown POIs (only tab shown), POI density (only tab shown), visit density (shown) and onsite time. The visit density tab has been selected and visit density is displayed on map 400.

Visit density may illustrate the density or concentration of driver visits on a given location. In other words, the more visits to a given location, the darker and bigger a spot, or other graphic indication, may be drawn on the map coordinates corresponding to that location. Likewise, the density map may be used to reveal the costs of providing service, indexed by geography, which may be due to route planning, infrastructure and/or demographic factors. The density map may also be used to reveal patterns in job duration or type-of-service due to geographic or demographic factors. Each of these may be trigger recommendations of specific actions to take, unrelated to, but revealed by the basic GPS trips and visit (e.g., TripsVisit data). Driver visits may be determined by system 200 from drivers' location-related data as described above. System 200 may extract all of a given branch's (or state's or region's) driver trips file data, including each driver's visits, as determined, e.g., by correlating vehicle stops and POIs, combine this data, and using the location-related data of each visit, plot on the map 400 the number of visits to each visit location and drawing a corresponding spot on the map 400 with a size and shade corresponding to the number of visits. System 200 may have presets that set a size and shade scale for the spot, e.g., indicating that a single visit may be denoted by a single, tiny, light grey spot, while 100 visits are indicated by a huge, black blob that is fifty (50) times as large. POI density may be determined and drawn on map 400 in a similar manner, but generally can only be displayed when map 400 view is zoomed out too much to see individual POI locations.

Onsite time (e.g., amount of time spent by drivers at a given location) may also be similarly drawn on map 400, with larger and darker spots for greater onsite time. Measures of onsite time may be indicative of managerial issues including, but not limited to, hasty work practices, adequate or inadequate customer "face time," customers whose needs exceed their current service contract or price, logistical issues, poor technical infrastructure, inaccurate data used when creating routes and schedules, inadequate staff training, and/or poor information gathering during the call intake process. Accordingly, onsite time measures may be generally indicative of operational efficiency, particularly when compared to planned on-site time.

As with maps on the various dashboards, displayed analytics 304, 324, 344, and 364 may be displayed in greater detail and with a larger view by being clicked on or otherwise selected for display from the dashboards.

Figure 4B:
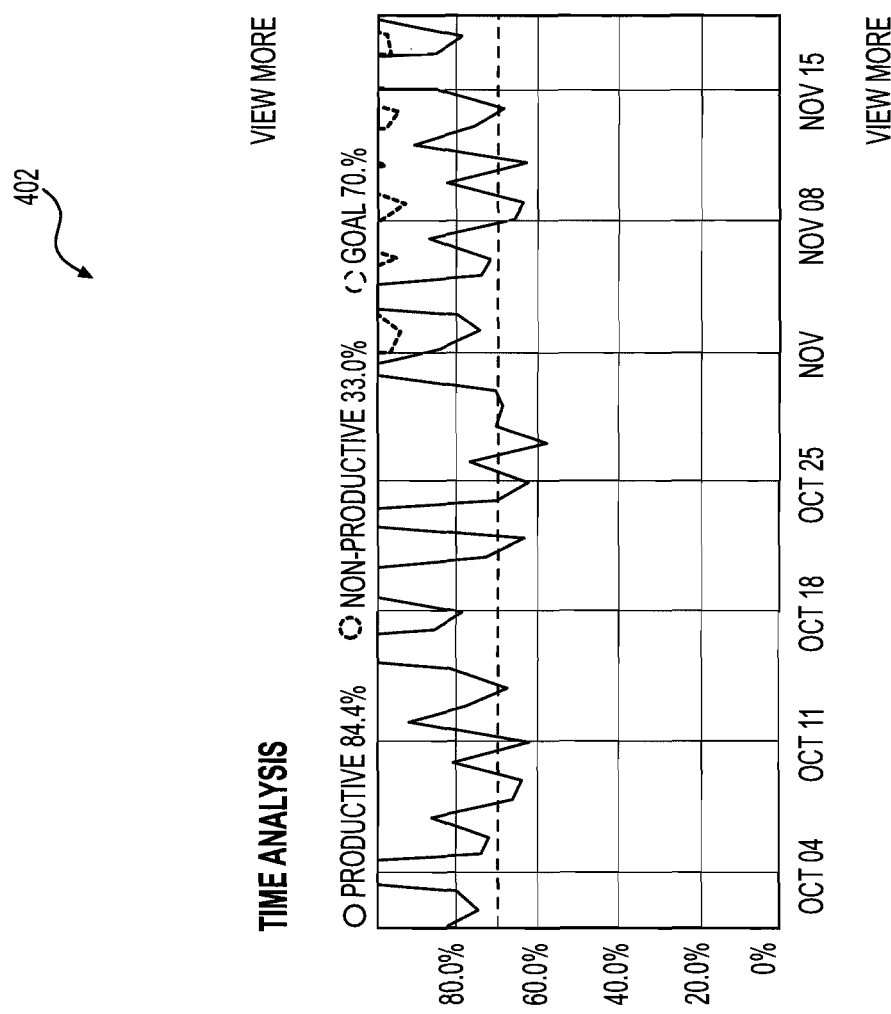

With reference now to FIG. 4B, shown is a close-up view of an embodiment of Time Analysis analytic 402 from dashboards 300, 320, 340, and 360. Time Analysis 402 is a graph showing drivers productivity percentage. In the Time Analysis 402 shown, light gray is percentage of driver time that is productive, dark gray is percentage of driver time that is non-productive and the lightest gray light is the goal level. As can be seen, the cumulative driver productivity is generally above goal. As seen in FIG. 4B, as well as FIGS. 3A-3D, analytics displayed on dashboards may include a "View More" hyperlink. Selecting the View More hyperlink may provide a display with greater detail than shown on the dashboard.

Figure 4C:
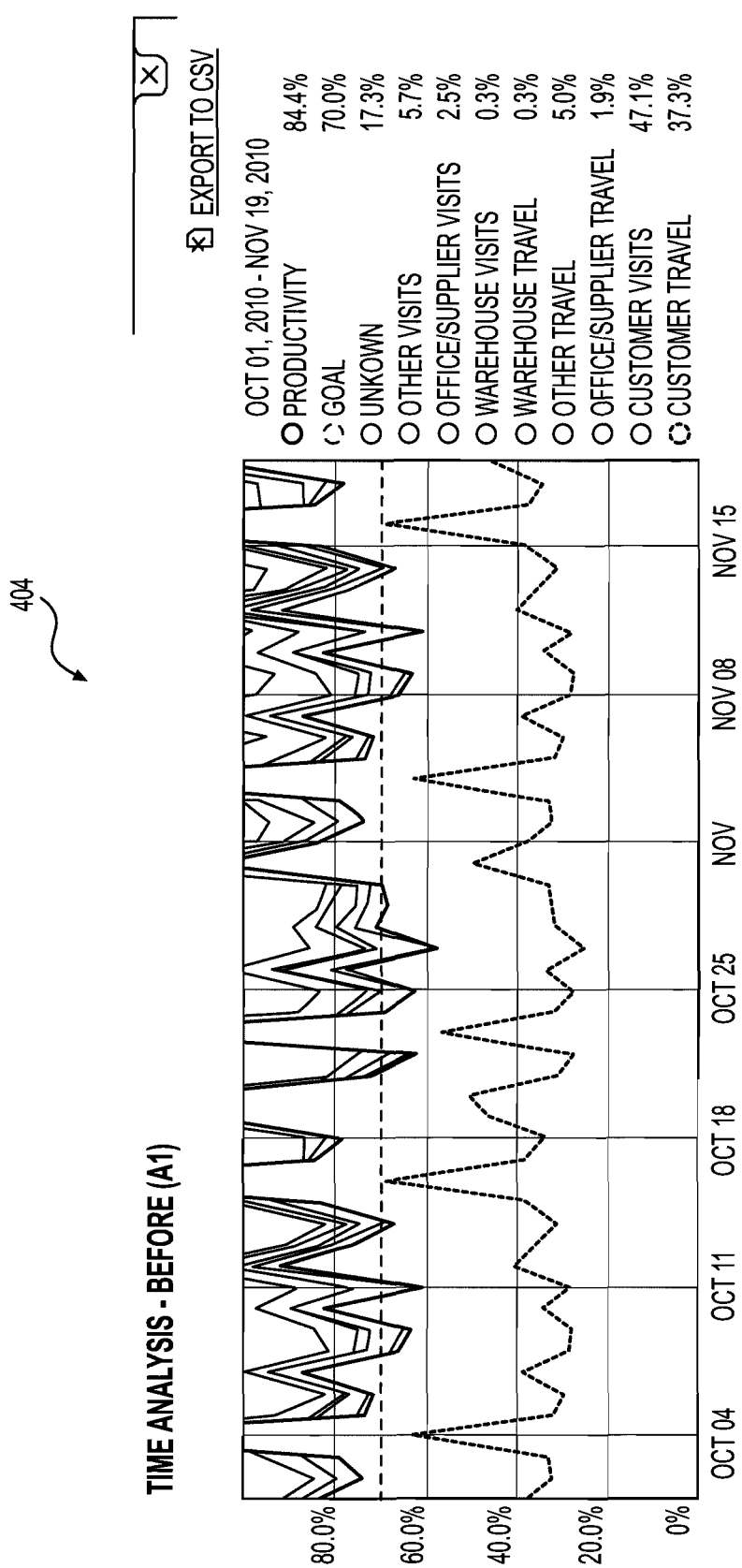

With reference now to FIG. 4C, shown is a screen shot of an embodiment of a greater detailed Time Analysis analytic 404 displayed by selecting the View More hyperlink. The Time Analysis 404 not only shows the productivity percentage of (in this example, a branch's (Before (A1))) drivers, but Time Analysis 404 also shows percentage of driver time spent on various activities, including office/supplier, warehouse, customer and other visits and travel to office/supplier, warehouse, customer and other locations. In embodiments, the data used to calculate these percentages is derived from the location-related data included in the trips file as described above. From location-based and other data extracted from the trips file, system 200 can calculate the amount of time spent on each of these types of visits as well as each of these types of travel. Using total driver time per work day, system 200 can calculate the percentages of the driver time each of these visits and travel types account for and then combine these calculated percentages to generate a Time Analysis 404 for the branch. System 200 may perform these calculations as needed, e.g., when a user selects the View More hyperlink to display Time Analysis 404, or may (e.g., continuously) perform and update these calculations in the background and display as requested. Time Analysis 404 may include a hyperlink to export the Time Analysis 404 data to a spreadsheet or other file.

As noted, each of the analytics displayed on the various dashboards may have View More or other links that may be selected to show the analytics in greater detail. FIG. 4D shows a screen shot of a greater detail Driver Performance analytic 406. As shown, Driver Performance analytic 406 is a table with additional columns of analysis for each driver of a branch. The analysis may be performed by system 200 based again on location-related data and other data extracted from trips files described above. System 200 may perform the analysis and calculate the analysis results for a given date range, which may be set by a user, as shown. Cost data used to calculate costs (e.g., costs per visit) may be based on enterprise user input or based on data imported by system 200.

Figure 4E:
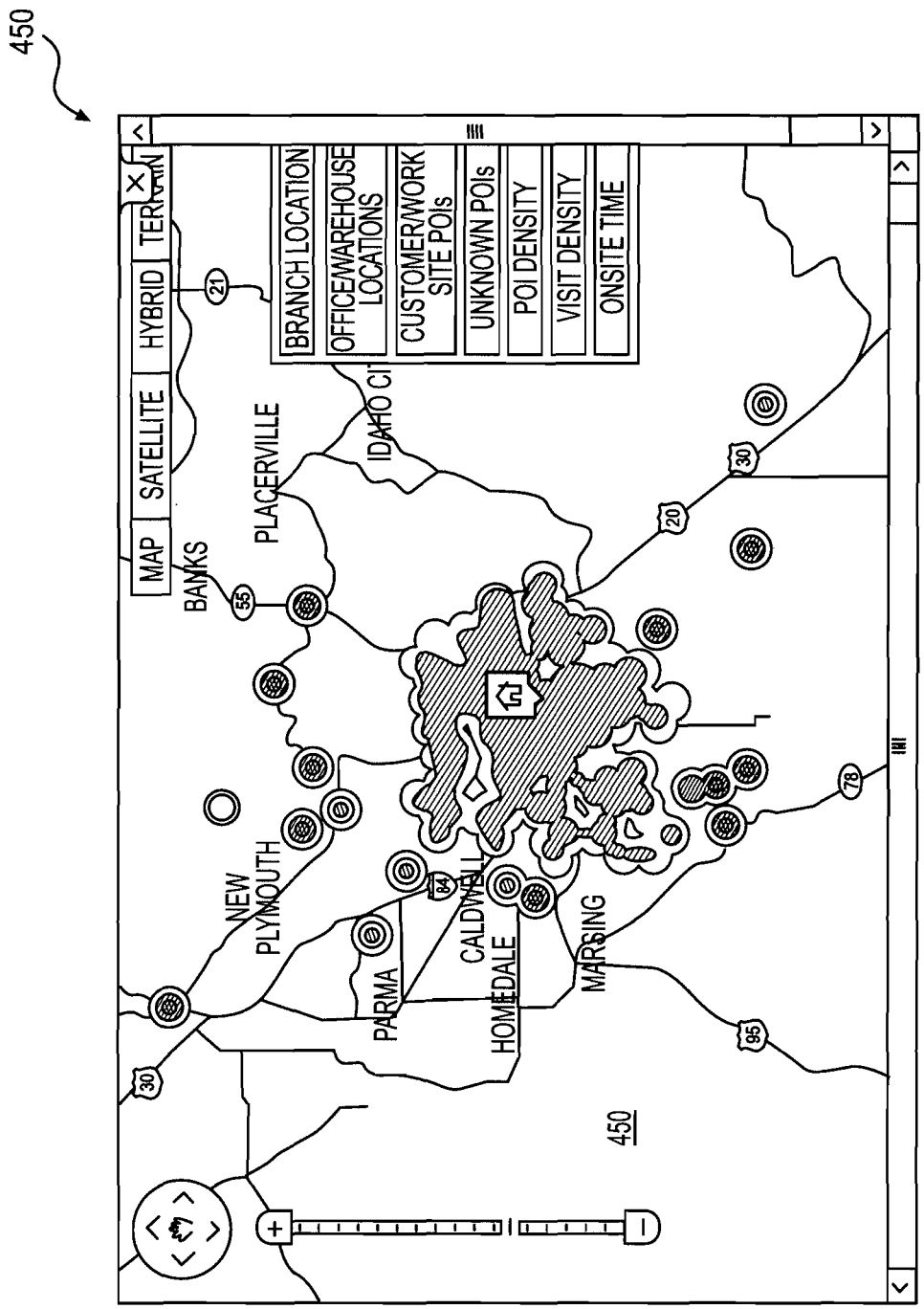

With reference now to FIG. 4E, shown is a screenshot illustrating another branch dashboard map 450. The visit density tab has been selected and visit density is displayed on map 450. The visit density shown in map 450 is higher than that in map 400. The visit density shown graphically illustrates where the branch's business is primarily located. Areas that are not as a high density may be areas that the branch targets for business development; accordingly, the visit density can enable the branch manager to intelligently select areas for business development. Other tabs may be selected on map 450 to show branch manager where customers are located versus office/warehouse locations.

Figure 5A:
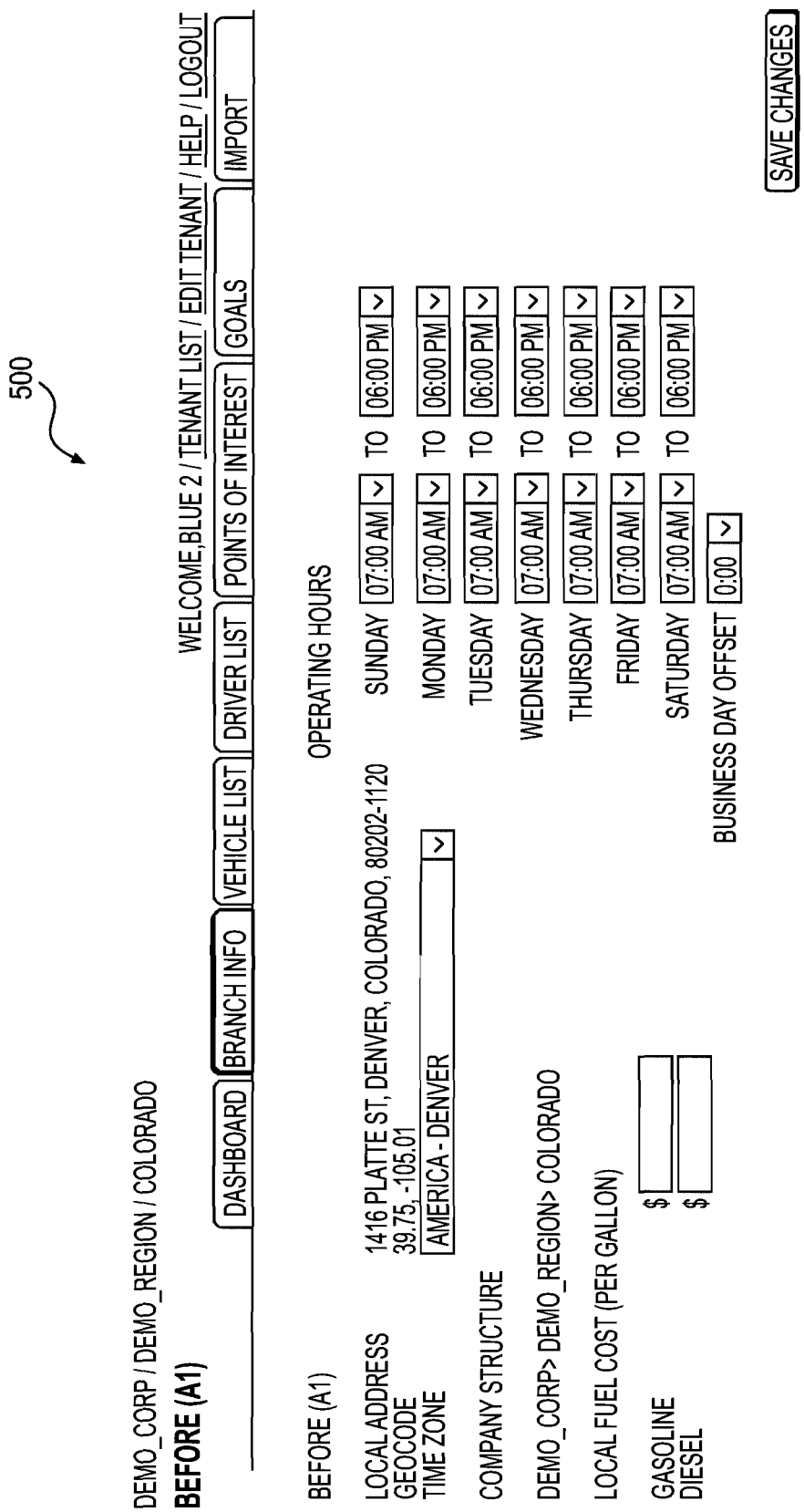

With reference now to FIG. 5A, shown is a screen-shot of an embodiment of branch information page 500. Branch information page 500 may include branch information, as shown. Branch information page may also include section for entry of cost information, such as local fuel costs, relevant to the branch. This cost information may be used by system 200 to perform costs analysis illustrated and described herein.

Figure 5B:
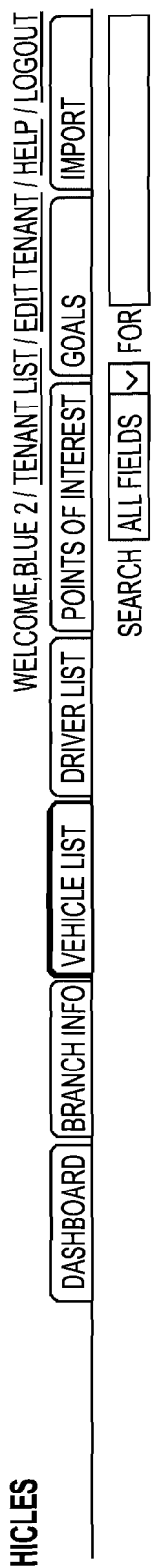

With reference now to FIG. 5B, shown is a screen-shot of an embodiment of vehicle information page 502. Vehicle information page 502 may include information about the vehicles of a branch (or state, region, or enterprise based on dashboard currently displayed), as shown. Vehicle information page 502 may also include an indication of a cost model (including cost model data 238) that applies to the given vehicle. The cost model data 238 may be used by system 200 to perform costs analysis illustrated and described herein. The cost model data 238 may indicate fuel consumption and other costs of using vehicle, and may provide different costs for idling, visits, driving on highways, in cities, at various speeds, in traffic, etc. The cost model data 238 may be stored in a separate file that is stored by system 200 (e.g., in system 200 database). Vehicle information page 502 may also indicate level (e.g., branch) to which vehicle is assigned).

With reference now to FIG. 5C, shown is a screen-shot of an embodiment of driver information page 504. Driver information page 504 may include information about the drivers of a branch (or state, region, or enterprise based on dashboard currently displayed), as shown. Driver information page 504 may also include an indication of a cost model (including cost model data 238) that applies to the given driver. The cost model data 238 may be used by system 200 to perform costs analysis illustrated and described herein. The cost model data 238 may indicate hourly rate, compensation costs and other costs associated with driver performing various tasks. The cost model data 238 may be stored in a separate file that is stored by system 200 (e.g., in system 200 database). Driver information page 504 may also indicate level (e.g., branch) to which driver is assigned).

With reference now to FIG. 5D, shown is a screen-shot of an embodiment of a driver dashboard page 510. Driver dashboard page 510 may be displayed by clicking on or otherwise selecting a driver on driver information page 504. In embodiments, driver dashboard page 510 may be displayed by clicking on or otherwise selecting a driver listed in analytics on branch dashboard page 300. Driver dashboard page 510 may include map 512 which may correspond to branch map 302, analytics 514, alerts 516 and tabs 520. Analytics 514 may include Performance, Daily Activity and Cost per visit analytics specific to the selected driver (in this example, A. Scott).

Figure 5E:
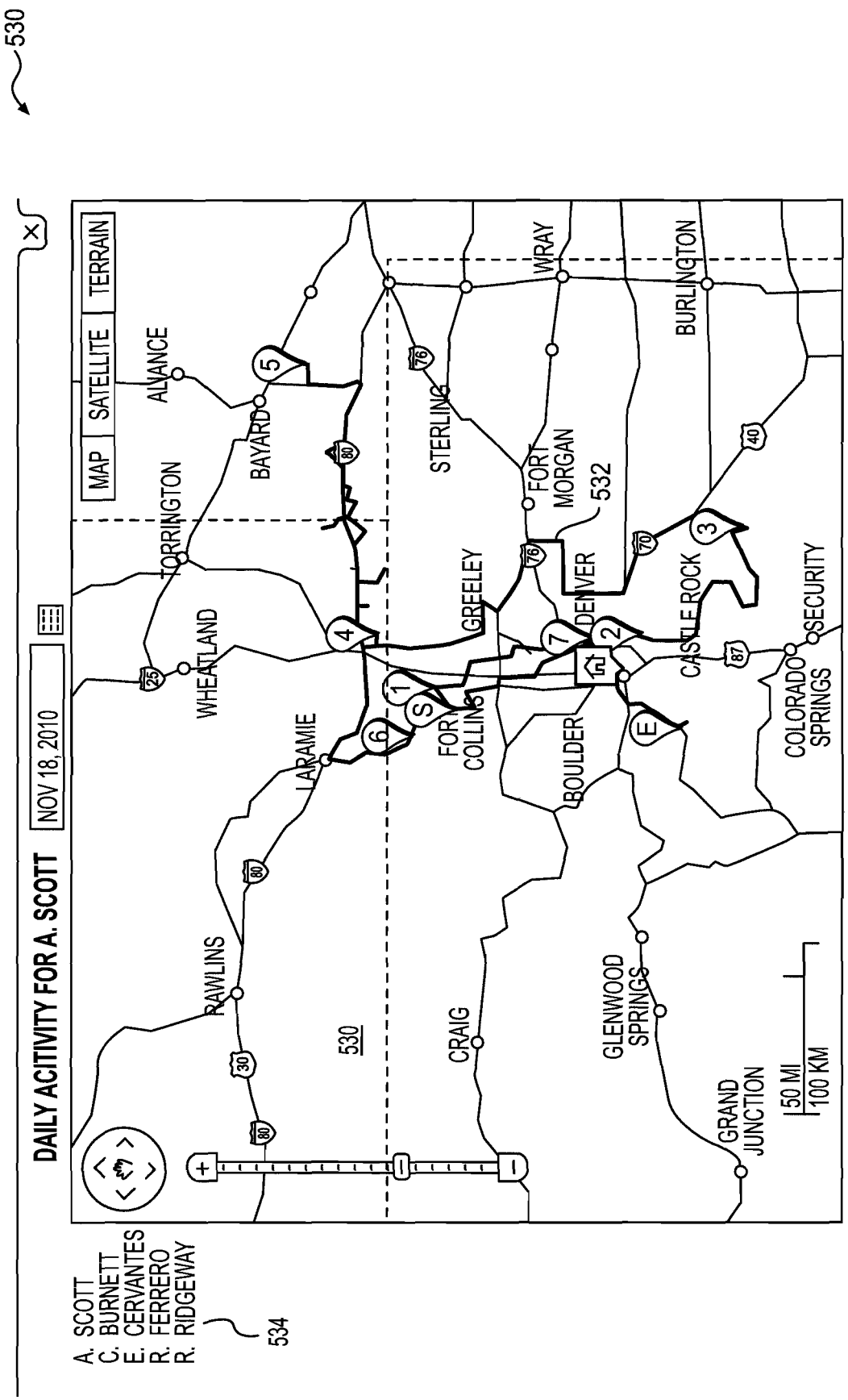

With reference now to FIG. 5E, shown is a screen-shot of an embodiment of a daily activity map 530 for drivers. Daily activity map 530 may be displayed by selecting branch map 302. Individual driver activity maps may be displayed by selecting driver dashboard map 512. Daily activity map 530 plots 532 of the routes taken by a branch's drivers on a selected day. The drivers' routes may be calculated by system 200 using data extracted from the trips files described above. System 200 may generate route plots 532 from these calculated routes and generate and add to, e.g., Google Map, using (GIS)/map presentation platform 216. Daily activity map 530 may also include driver list 534; selecting a given driver on the driver list 534 may cause an individual driver activity map (i.e., only the selected driver's route plot 532) to be displayed.

With reference now to FIG. 5F, shown is a screen-shot of an embodiment of a POI page 540. POI page 540 may list each POI for the branch (or state, region, or enterprise based on dashboard currently displayed), as shown. POI page 540 may include a map point ID corresponding to the POI'S location on map 302. POI page 540 may also list the POI type (customer, office/supplier, warehouse, etc.), address, whether a route stop or end point and number of visits. The number of visits for a POI may be updated by system 200 based on data extracted from the trips file.

With reference now to FIG. 5G, shown is a shown is a screen-shot of an embodiment of a goals page 550. Goals page 550 may list the specific goals set for the branch (or state, region, or enterprise based on dashboard currently displayed), as shown. As also show, goals page 550 may enable user to edit these goals. Goals may be added, changed or removed. Goals may be used by system 200 in performing analyses and generating analytics and, accordingly, may be displayed with analytics as described herein.

Figure 5H:
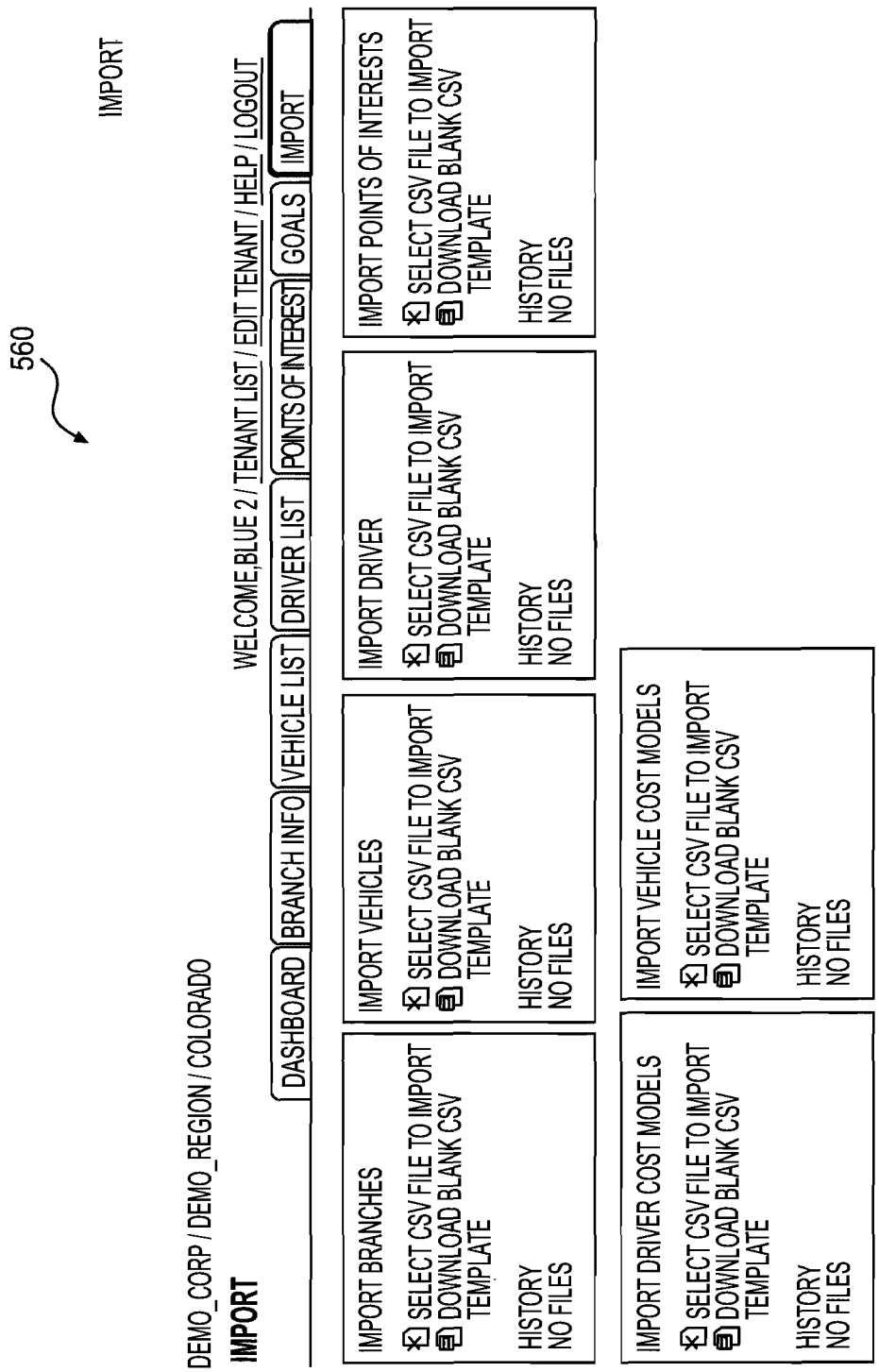

With reference now to FIG. 5H, shown is a shown is a screen-shot of an embodiment of an import page 560. Import page 560 may provide links for importing various files containing relevant information used in the performance and generation of analyses, analytics, maps and dashboards. Import page 560 may enable the import of branches files, listing and including branches information, vehicles files, listing and including vehicles information, drivers files, listing and including drivers information, POI files, listing and including POIs data 246, driver cost model data and vehicle cost model data. Other files may be imported using import page 560. Files may be Microsoft Excel™ or other types of files. Import page 560 also enables a user to download template files that may be filed in with the appropriate information.

With reference now to FIG. 5I, shown is an enterprise settings page 570. Enterprise settings page 570 may be used to enter various setting applicable to an entire enterprise. Similar settings may be made at lower levels, but are generally made at enterprise level to apply to the entire enterprise. For example, enterprise settings page 570 may include settings for activities that are considered productive. System 200 will use these settings an data extracted from the trips files indicating what activities a driver was performing to perform productivity analysis and calculate percentage productive for each driver. Enterprise settings page 570 may also include alerts. Example alerts shown include an alert if a driver's average % productive time was less than 40% over the preceding thirty days. Enterprise settings page 570 may also enable a user to upload an enterprise logo applicable to all enterprise dashboards and associated pages.

It is noted that the dashboards and pages shown may display other data, other analytics, other selections based on administrative or other user settings. For example, an enterprise may want its branch dashboard 300 to display High Cost Customer Accounts instead of Driver Performance or Daily Activity. An enterprise administrator or other user may select what data and/or analytics to display on the various dashboards. User profiles and access control levels may determine whether a given user may make such a change.

Figure 6:
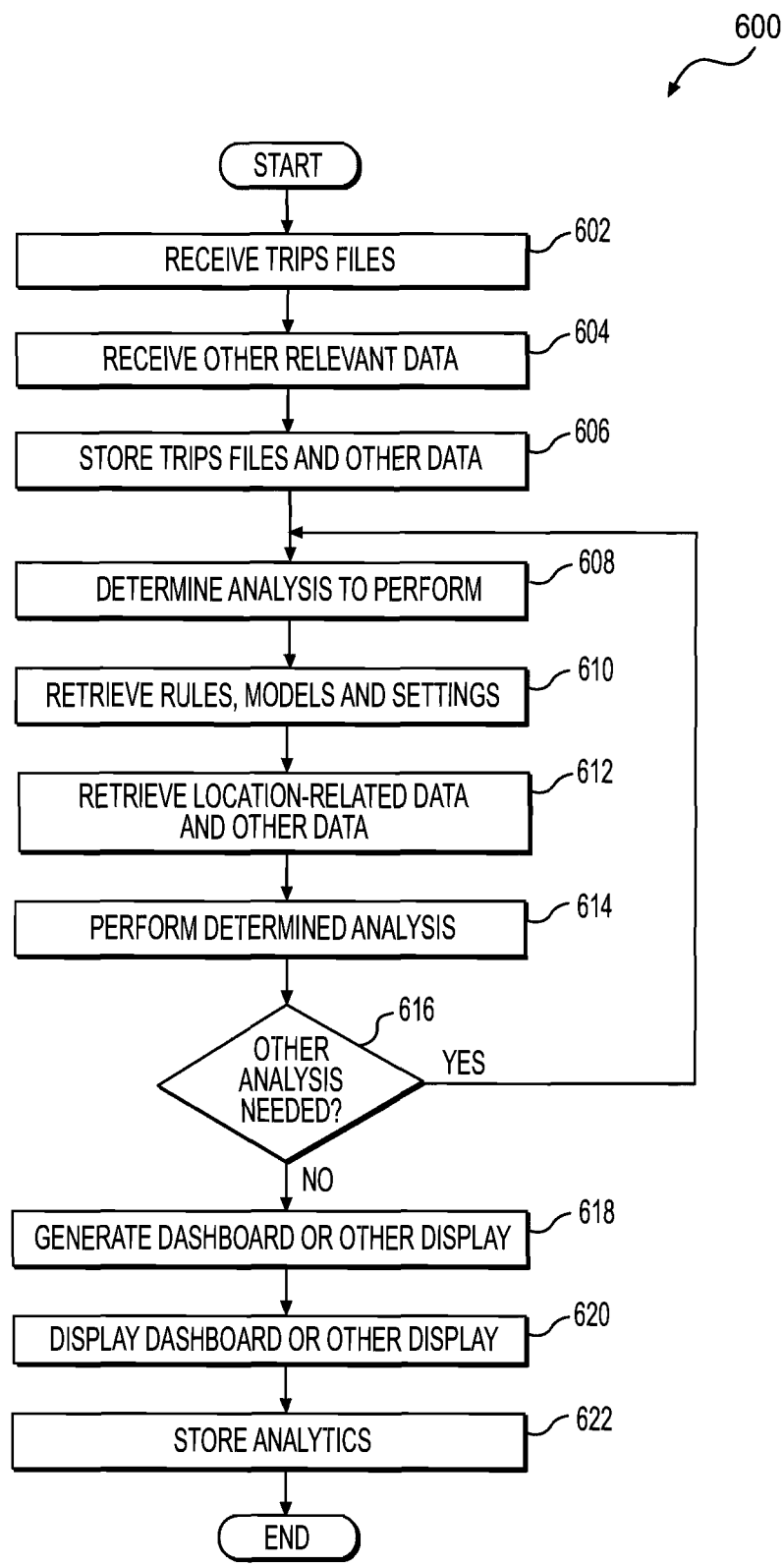
FIG. 6 is a flowchart illustrating an embodiment of a method for analyzing and presenting location-related data and analytics based on the analysis.

With reference now to FIG. 6, shown is a flowchart illustrating an embodiment of method 600 for analyzing location-related data and presenting location-related data and analytics based on or resulting from the analysis. In an embodiment, method 600 continues from process 100. Indeed, in embodiments, process 100 is a part of method 600. Method 600 receives processed location-related data (trips files), block 602, and receives other relevant data, block 604. Method 600 may store trips file and other data in system 200 databases, block 606. The trips file and other data may be stored 606 in databases of core analytical functionality 202. Method 600 may determine what analysis to perform, block 608. Method 600 may determine 608 an analysis to perform based on the dashboard or page to be displayed. For example, a user may request client platform 204 display a branch dashboard 300. Based on the analytics displayed on the branch dashboard 300, system 200 will know what analyses must be performed to generate and display the branch dashboard 300. Alternatively, method 600 may determine 608 an analysis to perform based on a schedule of continuously performed an updated analyses.

As indicated above, the analyses performed and metrics displayed may include, for example:

Deriving customer satisfaction metrics (e.g., "Didn't do a thorough job") from the basic time-and-distance GPS measurements;

Identifying the best-overall performing Branches and Drivers, independent of the effects of geography and mix of service types;

Identifying specific customers whose cost-of-service is excessive or is an outlier to the norm;

Providing comparisons with other companies whose operating conditions are similar (e.g., "Another company, in a similarly-congested city, is achieving an average of only 1.2 miles per customer visit");

Making automated recommendations of managerial policy and procedure adjustments (e.g., "re-assign the customer from Route A to Route B and change the visit days from Mondays to Tuesdays," or "increase the monetary penalty on out-sourced labor for late arrivals—in-house staff consistently out-performs them on this metric;"

Identifying the causes of variance between planned (or expected) measurements and the actual measurements (e.g., "Compare Planned vs. Actual Performance," for example, "Job durations are planned to be 30 minutes—the statistical mean is 43 minutes"); and Making these indicators (expressed in terms of common business performance measures) available to managers via an easily-accessed management-by-exception dashboard, as well as many other analyses and analytics described and illustrated herein and the Figures.

After determining 608 the analysis to perform, method 600 may retrieve user-created rules, models and other settings necessary to perform the determined 608 analysis, block 610. System 200 may have stored settings for each analysis indicating what rules, models and other settings are used to perform the analysis. As noted above, some analyses are performed using user-created rules (e.g., what activities are productive, goals, etc.), models (e.g., cost-models) and other settings. These rules, models and other settings may have been uploaded or otherwise input using client platform 204. Accordingly, system 200 may retrieve 610 these user-created rules, models and other settings from client platform. Core analytical functionality 202 may simply receive the user-created rules, models and other settings as user-entered input from dashboard or other pages described above. Also, user-created rules, models and other settings may be uploaded into core analytical functionality 202 databases as files, as described above.

With continuing reference to FIG. 6, method 600 may retrieve location-related data and other data used to perform determined 608 analysis, block 612. The location-related data and other data may be extracted from the relevant trips file. Accordingly, retrieving 612 may include determining the specific data needed and the relevant trips file. The data needed may be indicated in the determined 608 analysis settings stored by system 200. The relevant trips file may be determined based on settings in dashboard; for example, user may have requested analytics for a particular date or date ranges. Also, dashboard may have default settings for the analytics, such as "current" day, week, month or year, etc. Based on these settings or user input, method 600 may determine correct trips file(s) and retrieve 612 the necessary data by extracting it from the trips file(s).

Method 600 performs the determined analysis, block 614. In an embodiment, using the various user-created rules, models and other settings, the determined analysis, the retrieved data, core analytical functionality 202 of system 200 may perform 614 the determined 608 analysis to produce the requested analytics. If generating a dashboard with additional analytics, method 600 may determine if additional analysis needed, block 616, and then repeat blocks 608-614. When the necessary analyses are complete, method 600 may generate dashboard or other analytics display (e.g., the detailed analytics shown by selecting View More, see FIGS. 4A-4D above), block 618. In an embodiment, core analytical functionality 202 performs 614 analysis and forwards analysis results (analytics) to client platform 204; client platform 204 then generates 618 dashboard or other analytics display. Method 600 displays dashboard or other analytics display, block 620. Alternatively or after displaying, when system 200 continuously performs and updates analyses, method 600 may perform 614 determined analysis and store analysis results in system 200 database, block 622. Client platform 204 may retrieve stored analysis results when requested to generate 618 dashboard or other analytics display requiring the analysis results. Method 600 may repeat as needed for additional displays and analyses.

Figure 7:
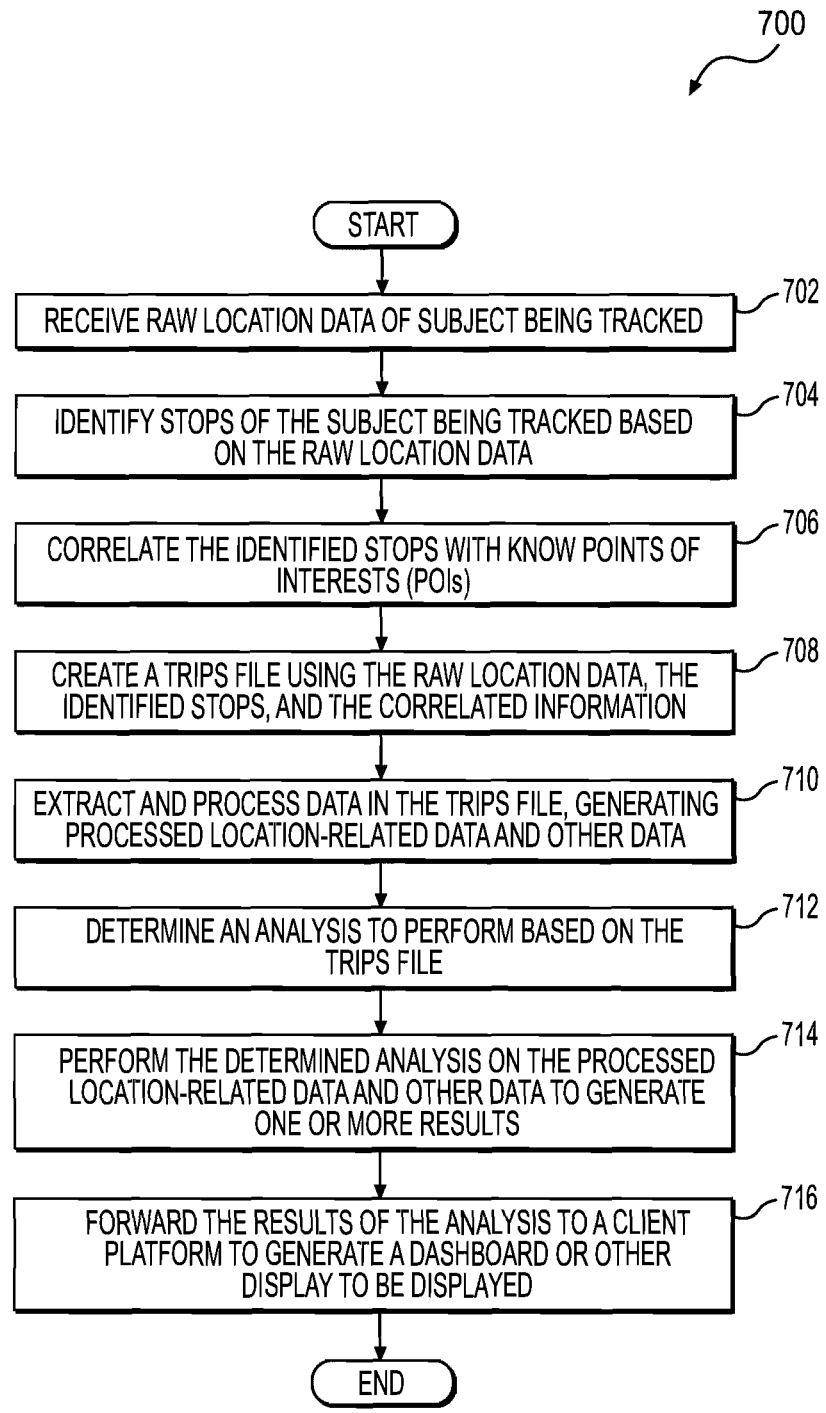
FIG. 7 is a flow chart illustrating an embodiment of a method for analzying location-related data and presenting location-related data and analytics.

As can be seen by the description herein, embodiments of the system and method provide business and operational insight by aggregating data from the relationship of multiple assets (e.g., customers, vehicles, employees, business facilities, other POIs and location based information, etc.), combining the aggregated data with other business inputs (e.g., cost, revenue, goals, targets, etc.) and third-party inputs (e.g., fuel costs, best in class performance data/metrics, industry insight, etc.) to enable visibility and insight into asset performance, correlation of assets, alerts, and recommendations that enable knowledge and improvement. Embodiments utilize business intelligence to analyze and correlate actual performance to a database of individual, business, industry and historical performance, libraries of related information and best practices to provide recommendations and serve as a resource to enable learning and improvement. Embodiments permit the analysis of multiple inputs and resources to enable relevant recommendations and knowledge to be shares, pushed and prioritized. Embodiments enable detailed analyses and comparisons of assets and data (e.g., asset to asset, asset to historical performance, asset to peer group, asset to best of class, asset to industry benchmarks, etc.). Similar analyses may be performed by enterprise hierarchy (e.g., branch to branch, region to region, business to business, etc.). FIG. 7 is a flow chart illustrating an embodiment of a method 700 for analyzing location-related data and presenting location-related data and analytics. Method 700 receives raw location data of a subject being tracked (block 702), identifies stops of the subject being tracked based on the raw location data (block 704), correlates the identified stops with know POIs (block 706), and creates a trips file using the raw location data, the identified stops, and the correlated information (block 708). Method 700 further extracts and processes data in the trips file, generating processed location-related data and other data (block 710), determines an analysis to perform based on the trips file (block 712), performs the determined analysis on the processed location-related data and other data to generate one or more results (block 714), and forwards the results of the analysis to a client platform to generate a dashboard or other display to be displayed (block 716), such as displays and dashboards illustrated in FIGS. 3A-5I.

Figure 8:
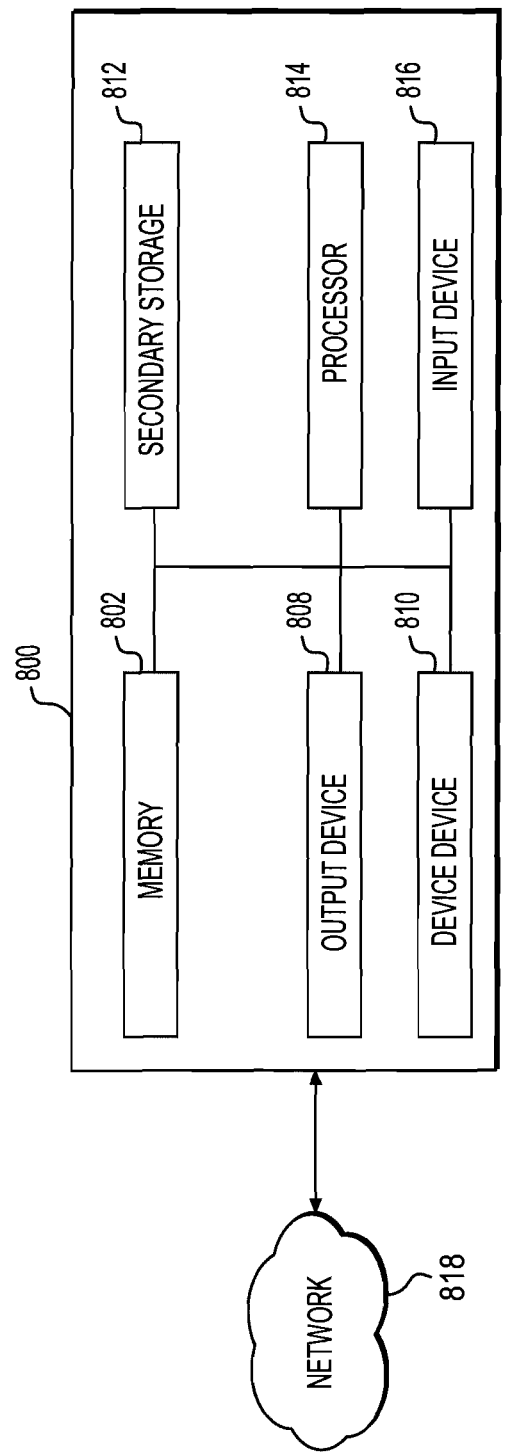
FIG. 8 is a block diagram illustrating exemplary hardware components for implementing embodiments of the system and method for analyzing location-related data and presenting location-related data and analytics.

With reference now to FIG. 8, shown is a block diagram illustrating exemplary hardware components for implementing embodiments of the system and method for analyzing location-related data and presenting location-related data and analytics. Server 800, or other computer system similarly configured, may include and execute one or more programs to perform functions described herein, including steps of the method described above. Likewise, a mobile device which includes some of the same components of computer system 800 may perform steps of the method described above. Computer system 800 may connect with network 818, e.g., Internet, or other network, to receive inquires, obtain data, and transmit information and incentives as described above.

Computer system 800 typically includes a memory 802, a secondary storage device 812, and a processor 814. Server 800 may also include a plurality of processors 814 and be configured as a plurality of, e.g., bladed servers, or other known server configurations. Server 800 may also include an input device 816, a display device 810, and an output device 808. Memory 802 may include RAM or similar types of memory, and it may store one or more applications for execution by processor 814. Secondary storage device 812 may include a hard disk drive, floppy disk drive, CD-ROM drive, or other types of non-volatile data storage. Processor 814 executes the application(s), which are stored in memory 802 or secondary storage 812, or received from the Internet or other network 818. The processing by processor 814 may be implemented in software, such as software modules, for execution by computers or other machines. These applications preferably include instructions executable to perform the functions and methods described above and illustrated in the Figures herein. The applications preferably provide GUIs through which users may view and interact with the application(s).

Also, as noted, processor 814 may execute one or more software applications in order to provide the functions described in this specification, specifically to execute and perform the steps and functions in the methods described above. Such methods and the processing may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the system for analyzing location-related data and presenting location-related data and analytics.

Input device 816 may include any device for entering information into computer system 800, such as a touch-screen, keyboard, mouse, cursor-control device, microphone, digital camera, video recorder or camcorder. The input device 816 may be used to enter information into GUIs during performance of the methods described above. Display device 810 may include any type of device for presenting visual information such as, for example, a computer monitor or flat-screen display (or mobile device screen). The display device 810 may display the GUIs and/or output from the application(s). Output device 808 may include any type of device for presenting a hard copy of information, such as a printer, and other types of output devices include speakers or any device for providing information in audio form.

Examples of computer system 800 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 800 is shown in detail, embodiments of the system for analyzing location-related data and presenting location-related data and analytics may use multiple computer systems or servers as necessary or desired to support the users and may also use back-up or redundant servers to prevent network downtime in the event of a failure of a particular server. In addition, although computer system 800 is depicted with various components, one skilled in the art will appreciate that computer system 800 can contain additional or different components. In addition, although aspects of an implementation consistent with the above are described as being stored in memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling a computer system, such as computer system 800; to perform a particular method, such as methods described above.

The terms and descriptions used herein are set forth by way of illustration only and are not meant as limitations. Those skilled in the art will recognize that many variations are possible within the spirit and scope of the invention, and their equivalents, in which all terms are to be understood in their broadest possible sense unless otherwise indicated.

What is claimed is:

1. A method for analyzing and presenting location and location-related data of a subject being tracked, the method comprising:

calculating raw location data of the subject being tracked by a tracker installed in or carried by the subject being tracked;

transmitting the raw location data of the subject being tracked by the tracker;

receiving the raw location data of the subject being tracked from the tracker;

identifying stops of the subject being tracked based on the raw location data;

correlating the identified stops with known points of interests (POIs);

creating a trips file using the raw location data, the identified stops, and the correlated information;

extracting and processing data in the trips file, generating processed location-related data and other data, including cost model data;

determining a plurality of analyses based on the trips file, the plurality of analyses including a cost per visit analysis of one or more visits of the subject to one or more POIs;

retrieving settings for the plurality of analyses, wherein the settings are stored for each analysis indicating what rules and models are to be used to perform each analysis;

automatically performing the plurality of analyses at regular intervals on the processed location-related data and other data to generate one or more results by using the rules and models for each analysis, including performing the cost per visit analysis using the cost model data; and forwarding the results of the plurality of analyses to a client platform to generate a dashboard to be concurrently displayed, the dashboard to display a result of the cost per visit analysis.

2. The method of claim 1, wherein the raw location data is raw global positioning satellite (GPS) data.

3. The method of claim 1, wherein the raw location data includes location data and a time-stamp.

4. The method of claim 1, wherein the receiving raw location data step includes transforming raw location data from other formats.

5. The method of claim 1, further comprising storing the trips file in a database.

6. The method of claim 1, further comprising performing calculations to fill in gaps in the raw location data, wherein the gaps results from one or more of transmission or calculation errors and failure of a global positioning satellite (GPS) tracker to receive a GPS signal.

7. The method of claim 6, wherein the calculations includes extrapolating positions of the subject being tracked based on one or more of surroundings, known global positioning satellite (GPS) data, and other sources of location data.

8. The method of claim 1, wherein the identifying stops step includes:
 determining a time period when the subject being tracked does not move; and
 if the subject being tracked does not move over a predetermined threshold period of time, identifying the time period as a stop.

9. The method of claim 1, wherein the raw location data includes information indicating a vehicle status, and wherein the identifying stops step includes determining from the received raw location data whether a vehicle engine is off.

10. The method of claim 1, wherein the identifying stops step includes determining and recording a time period spent at a stop.

11. The method of claim 1, further comprising determining a person riding in a vehicle by correlating location information gathered from a GPS-enabled mobile device associated with a person and location information of a GPS-enabled vehicle, including:
 recording locations of the mobile device at a first set of points in time;
 recording locations of the GPS-enabled vehicle at a second set of points in time;
 determining pairings between the mobile device and the GPS-enabled vehicle by similar movement patterns and locations over a predetermined measurement period;
 storing the pairings of the mobile device and the GPS-enabled vehicle; and
 displaying the pairings of mobile device and the GPS-enabled vehicle.

12. The method of claim 11, wherein the second set of points in time is the same as the first set of points in time.

13. The method of claim 1, wherein the known POIs are input by a user.

14. The method of claim 1, wherein the known POIs are uploaded from a file.

15. The method of claim 1, wherein the known POIs include customer locations, franchises, warehouses, vendor locations, and maintenance facilities.

16. The method of claim 1, wherein the known POIs include one or more planned destinations of a person assigned to a vehicle, and wherein the correlating step includes correlating the identified stops with the one or more planned destinations to determine if the person assigned to the vehicle has visited the one or more planned destinations.

17. The method of claim 1, wherein the creating trips file step includes retrieving other relevant information to create the trips file.

18. The method of claim 17, wherein the other relevant information includes which level of organization the location-related data applies.

19. The method of claim 1, further comprising retrieving the processed location-related data and other data to perform the plurality of analyses, wherein the retrieving the processed location-related data and other data step includes determining specific data needed and a relevant trips file.

20. The method of claim 1, wherein the results of the analysis are plotted on a map in terms of amount of time spent at each visit location, and wherein a corresponding spot is drawn on the map with a size and shade scale corresponding to the amount of time.

21. The method of claim 1, wherein the determined analysis includes identifying the cause of variance between the planned activities and the corresponding actual activities.

22. A non-transitory computer readable medium of a system that includes a processor, the system coupled to a subject being tracked, the non-transitory computer readable medium providing instructions for analyzing and presenting location and location-related data of the subject being tracked, the instructions causing the processor to perform operations comprising:
 receiving raw location data of the subject being tracked from a tracker installed in or carried by the subject being tracked, wherein the tracker calculates the raw location data of the subject being tracked and transmits the raw location data of the subject being tracked;
 identifying stops of the subject being tracked based on the raw location data; correlating the identified stops with known points of interests (POIs);
 creating a trips file using the raw location data, the identified stops, and the correlated information;
 extracting and processing data in the trips file, generating processed location-related data and other data, including cost model data;
 determining a plurality of analyses based on the trips file, the plurality of analyses including a cost per visit analysis of one or more visits of the subject to one or more POIs;
 retrieving settings for the plurality of analyses, wherein the settings are stored for each analysis indicating what rules and models are to be used to perform each analysis;

automatically performing the plurality of analyses at regular intervals on the processed location-related data and other data to generate one or more results by using the rules and models for the determined analysis, including performing the cost per visit analysis using the cost model data; and forwarding the results of the plurality of analyses to a client platform to generate a dashboard to concurrently display the results of the plurality of analyses, the dashboard to display a result of the cost per visit analysis.

23. The non-transitory computer readable medium of claim 22, wherein the determined analysis includes identifying the cause of variance between the planned activities and the corresponding actual activities.

24. A system for analyzing and presenting location and location-related data of a subject being tracked, the system coupled to the subject being tracked, the system comprising:

an external data source application programming interface (API) that receives raw location data of the subject being tracked from a tracker installed in or carried by the subject being tracked wherein the tracker calculates the raw location data of the subject being tracked and transmits the raw location data of the subject being tracked; and a server configured to:
  identify stops of the subject being tracked based on the raw location data,
  correlates the identified stops with known points of interests (POIs),
  create a trips file using the raw location data, the identified stops, and the correlated information,
  extract and processes data in the trips file, generating processed location-related data and other data, including cost model data,
  determine a plurality of analyses based on the trips file, the plurality of analyses including a cost per visit analysis of one or more visits of the subject to one or more POIs,
  retrieve settings for the plurality of analyses, wherein the settings are stored for each analysis indicating what rules and models are to be used to perform each analysis,
  automatically perform the plurality of analyses at regular intervals on the processed location-related data and other data, to generate one or more results by using the rules and models for each analysis, including performing the cost per visit analysis using the cost model data, and
  forward the results of the plurality of analyses to a client platform to generate a dashboard to be concurrently displayed, the dashboard to display a result of the cost per visit analysis.

25. The system of claim 24, further comprising administration and management tools that support administration control and configuration functionality of the one or more modules.

26. The system of claim 24, further comprising an authentication directory that supports user access control and personalization functionality of the one or more modules.

27. The system of claim 24, further comprising a geographical information server (GIS)/map presentation platform that supports POI data processing of the one or modules and generates maps and charts illustrating POI data, driver and vehicle route data derived from location-related data, and analytics derived from correlation of the driver and vehicle route data and the cost model data.

28. The system of claim 24, wherein the client platform includes data upload receivers, download modules, a user interface platform, a charting/visualization platform, and an embedded help module.

29. The system of claim 24, wherein the external data source API receives other relevant information from external partner or customer data sources.

30. The system of claim 24, wherein the determined analysis includes identifying the cause of variance between the planned activities and the corresponding actual activities.

* * * * *